United States Patent
Yang et al.

(10) Patent No.: US 9,667,666 B2
(45) Date of Patent: May 30, 2017

(54) CONTROL APPARATUS, CONTROL TARGET APPARATUS, AND METHOD FOR OPERATING THE CONTROL, APPARATUS AND THE CONTROL TARGET APPARATUS IN MULTIPLE NETWORKS

(75) Inventors: Seungryul Yang, Seoul (KR); Youngwook Kang, Seoul (KR); Minsoo Lee, Seoul (KR); Jangwoong Park, Seoul (KR); Chanhun Jeon, Seoul (KR); Beom Jin Jeon, Seoul (KR); Jinho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 13/979,078

(22) PCT Filed: Jan. 11, 2012

(86) PCT No.: PCT/KR2012/000256
§ 371 (c)(1),
(2), (4) Date: Jul. 10, 2013

(87) PCT Pub. No.: WO2012/096505
PCT Pub. Date: Jul. 19, 2012

(65) Prior Publication Data
US 2013/0290551 A1    Oct. 31, 2013

Related U.S. Application Data

(60) Provisional application No. 61/431,446, filed on Jan. 11, 2011, provisional application No. 61/485,639, filed on May 13, 2011.

(51) Int. Cl.
*G06F 15/16*    (2006.01)
*G06F 15/177*   (2006.01)
(Continued)

(52) U.S. Cl.
CPC ...... *H04L 65/1013* (2013.01); *H04L 12/2803* (2013.01); *H04L 65/1083* (2013.01); *H04W 36/0066* (2013.01)

(58) Field of Classification Search
CPC ............... H04L 29/06; H04L 29/08072; H04L 29/08576; H04L 29/0809; H04L 29/06537;
(Continued)

(56) References Cited

U.S. PATENT DOCUMENTS 6,400,946 B1 * 6/2002 Vazvan .............. H04B 7/18563
455/432.1
2003/0126243 A1 * 7/2003 Kudo ................ H04L 29/12254
709/222

(Continued)

FOREIGN PATENT DOCUMENTS

KR    10-2005-0117349 A    12/2005
KR    10-2007-0010401 A    1/2007
KR    10-2008-0017700 A    2/2008

*Primary Examiner* — Mahran Abu Roumi
(74) *Attorney, Agent, or Firm* — Dentons US LLP

(57) ABSTRACT

A control target device receives, from a control point device connected to a first network, a message for requesting movement to a second network. The control target device transmits a network movement advertising message to the control point device of the first network. The control target device disconnects from the first network and accesses the second network.
The control point device collects device information on a plurality of control target devices connected to a plurality of networks. When a network of one control target device selected from the plurality of control target devices is different from a network of the control point device, the control point device accesses the network of the selected control target device.

9 Claims, 26 Drawing Sheets

(51) Int. Cl.
*H04W 36/00* (2009.01)
*H04L 29/06* (2006.01)
*H04L 12/28* (2006.01)

(58) Field of Classification Search
CPC ......... H04L 29/08981; H04L 41/0806; H04W 36/30; H04W 36/18; H04W 36/08; H04W 36/14; H04W 36/12; G06F 9/4416
USPC .......................................... 455/436; 709/228
See application file for complete search history.

(56) References Cited

U.S. PATENT DOCUMENTS

| | | | | |
|---|---|---|---|---|
| 2003/0224792 | A1* | 12/2003 | Verma | H04L 29/06 455/436 |
| 2007/0072615 | A1* | 3/2007 | Kim | H04W 36/0005 455/436 |
| 2009/0006635 | A1* | 1/2009 | Siegmund | H04L 29/12028 709/228 |
| 2009/0285175 | A1* | 11/2009 | Nix | H04L 29/125 370/331 |
| 2011/0177780 | A1* | 7/2011 | Sato | H04W 36/14 455/41.1 |
| 2012/0265913 | A1* | 10/2012 | Suumaki | H04W 4/008 710/303 |

* cited by examiner

FIG.7
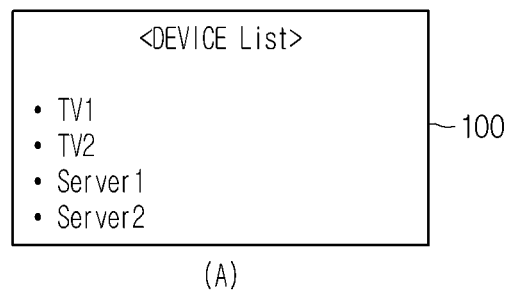
(A)
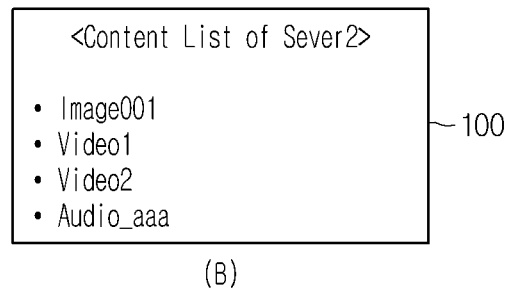
(B)

FIG.8
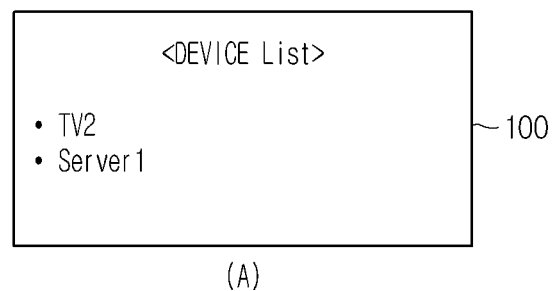
(A)
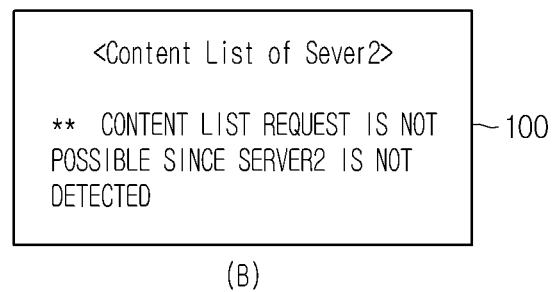
(B)

FIG.9
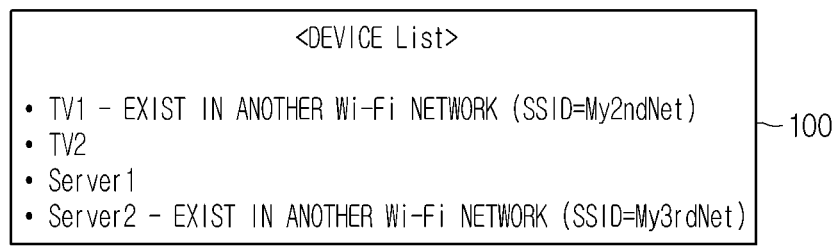
(A)
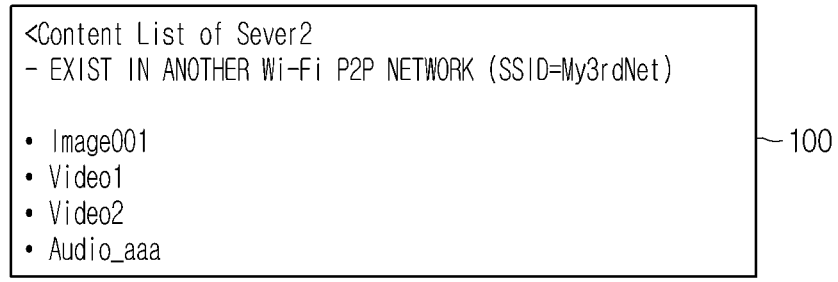
(B)

FIG.10
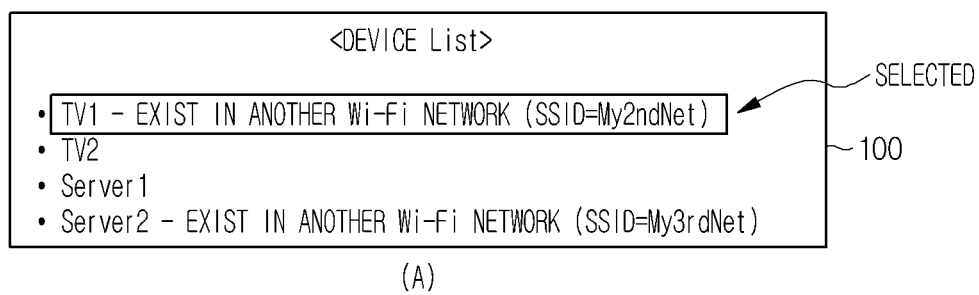
(A)
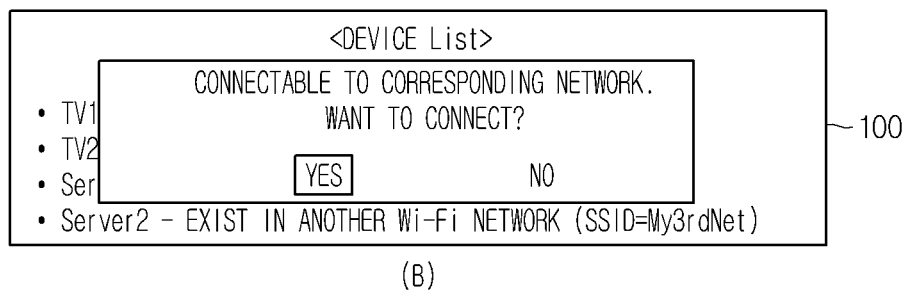
(B)
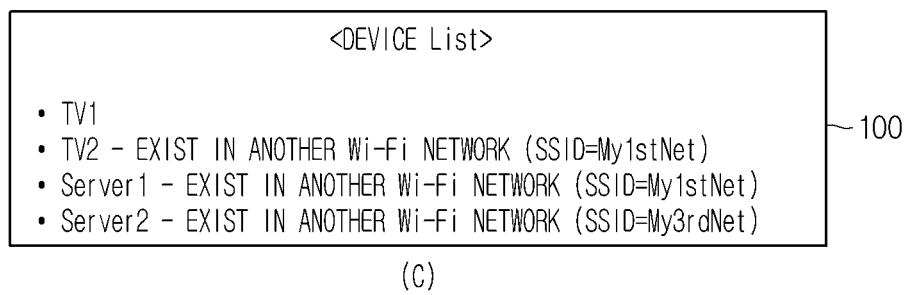
(C)

FIG.14
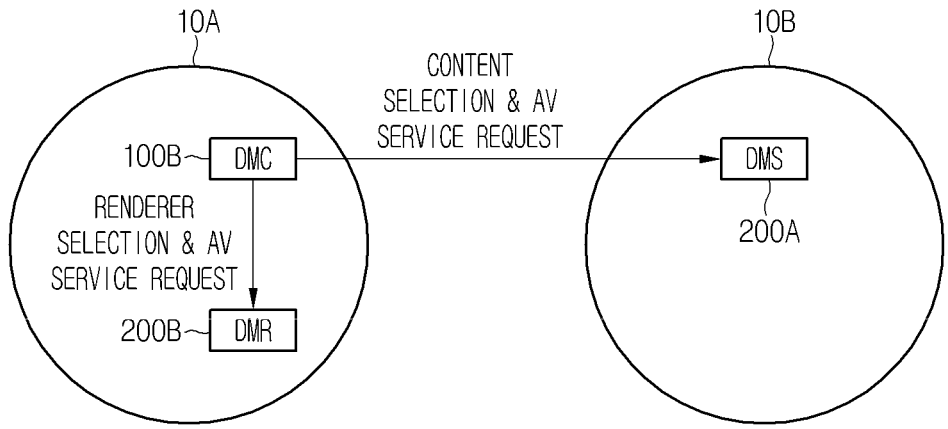
(A)
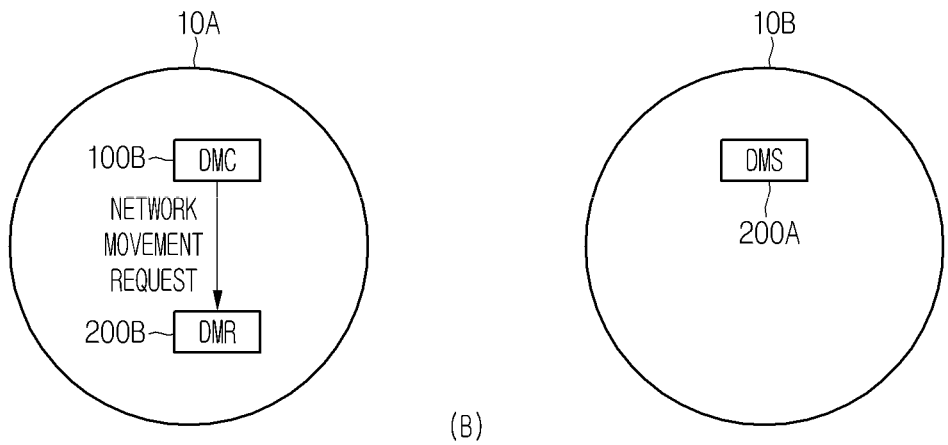
(B)
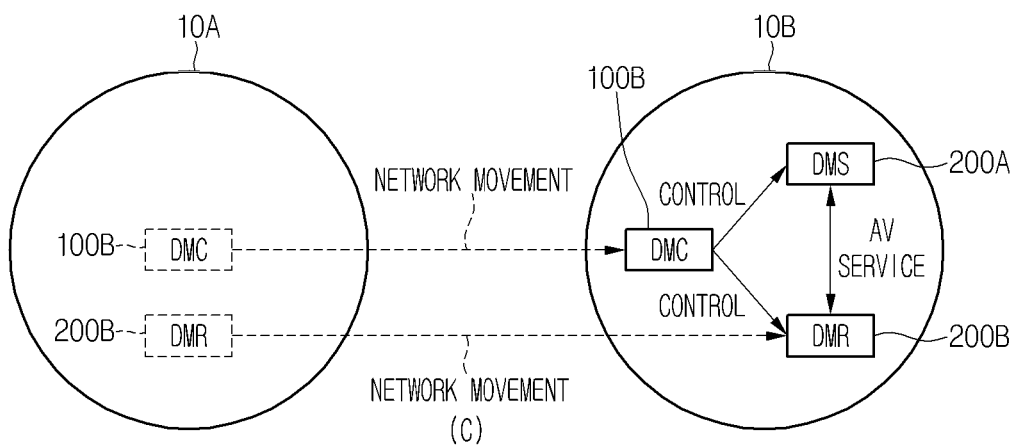
(C)

FIG.15
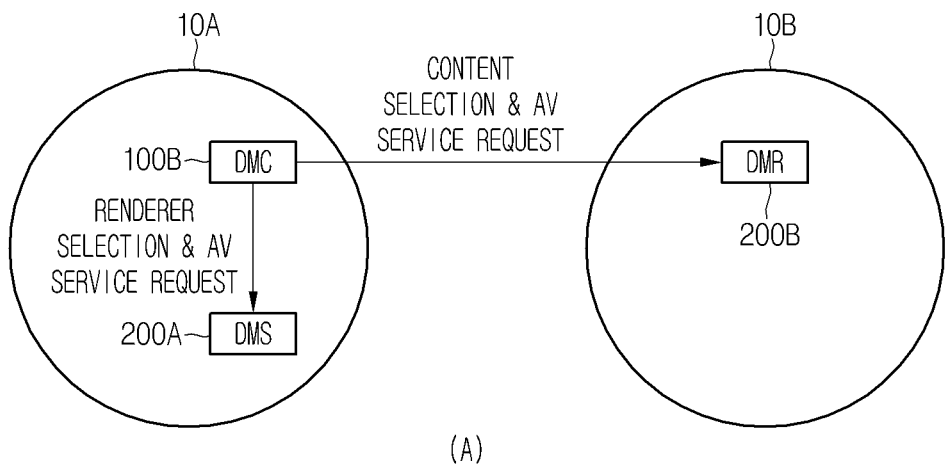
(A)
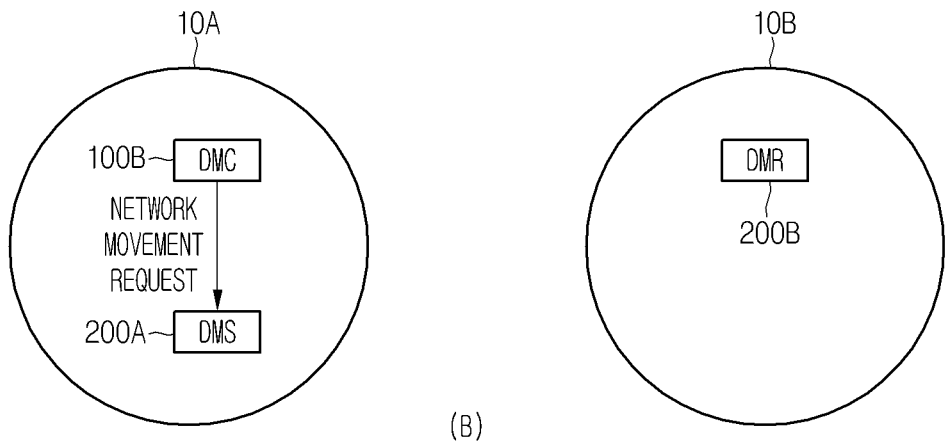
(B)
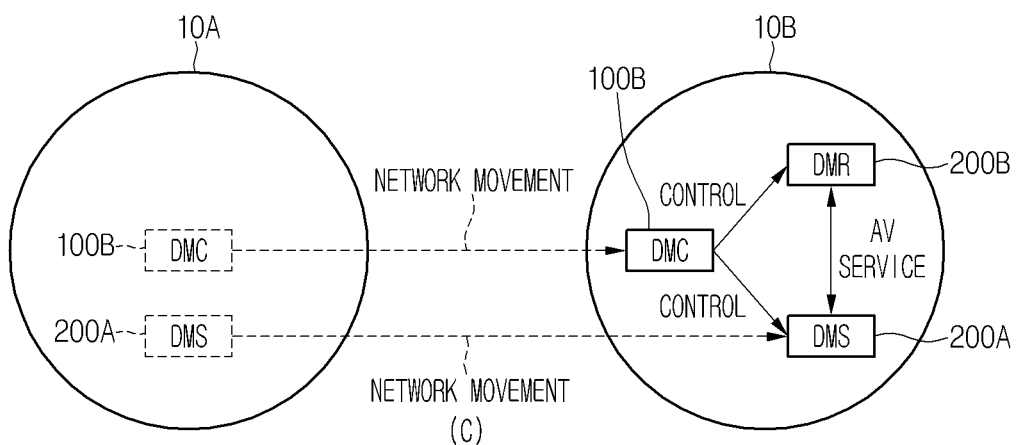
(C)

CONTROL APPARATUS, CONTROL TARGET APPARATUS, AND METHOD FOR OPERATING THE CONTROL, APPARATUS AND THE CONTROL TARGET APPARATUS IN MULTIPLE NETWORKS

This application is a 35 USC §371 National Stage entry of International Application No. PCT/KR2012/000256 filed Jan. 11, 2012, and claims priority of U.S. provisional Application No. 61/431,446 filed Jan. 11, 2011 and 61/485,639 filed May 13, 2011, which are hereby incorporated by reference in its entirety.

TECHNICAL FIELD

The present disclosure relates to a control device and a control target device, and more particularly, to a method of operating a control device and a control target device in a multiple network.

BACKGROUND ART

A universal plug and play (UPnP) technology and a digital living network alliance (DLNA) technology enable electronic devices of various manufactures to provide services to each other and control each other. In particular, the UPnP technology enables provision of compatible audio-visual (AV) services and control between AV devices. The compatible AV service includes media steaming, uploading, and downloading.

The DLNA technology regulates home network devices such as a digital media server (DMS), a digital media player (DMP), a digital media renderer (DMR), a digital media controller (DMC), and a digital media printer (DMPr), and regulates mobile devices such as a mobile digital media server (M-DMS), a mobile digital media player (M-DMP), a mobile digital media uploader (M-DMU), a mobile digital media downloader (M-DMD), and a mobile digital media controller (M-DMC).

Hereinafter, the DMS also refers to the M-DMS, the DMP also refers to the M-DMP, and the DMC also refers to the M-DMC.

The UPnP technology classifies such devices into control point (CP) devices and control target devices. The DMC and DMP may be classified as CP devices, and the DMR, DMS, and DMPr may be classified as control target devices.

The DLNA technology defines a 2-box model and a 3-box model.

The 2-box model includes the DMP and the DMS. In the 2-box model, the DMP enables a user to search for and play content browsed and distributed by the DMS.

The 3-box model includes the DMC, the DMS, and the DMR. In the 3-box model, the DMC enables the user to search for content of the DMS to be played in the DMR.

Devices compliant with the UPnP and DLNA technologies sends and receives commands through internet protocol (IP) networking. That is, one of AV devices connected to the same network may provide an AV service to another device, may receive an AV service from another device, may control another device, or may be controlled by another device.

With the development of a multiple network environment, a plurality of networks that may be connected to each other through an access point or group owner may exist in a space where the user uses the UPnP/DLNA technology. In the case of the Ethernet or Wi-Fi, one network may be formed around the access point, and in the case of Wi-Fi P2P, another network may be formed around the group owner. That is, a plurality of access points may form a multiple network environment, a plurality of group owners may form the multiple network environment, and at least one access point and at least one group owner may form the multiple network environment. In particular, since a guideline for a DLNA operation through the Wi-Fi P2P is defined, the multiple network environment may be more general user environment of the UPnP/DLNA technology.

Currently, DPnP and DLNA operations of a single device are defined only on a network to which the device is connected, only information sharing and AV service provision between devices connected to the network are possible.

However, when the CP device and the control target device are connected to different networks, following problems may occur.

Firstly, since the CP device does not have state information of the control target device, the CP device may not determine whether a DLNA operation such as a media service and a UPnP operation are completely unavailable due to suspension of operation of the control target device, or the control target device exists in another network.

Further, even through the CP device may detect that the control target device exists in another network, it is difficult for the CP device to find the network to the control target device belongs, from among a plurality of networks.

In addition, although additional network access or network movement of the CP device or the control target device is required in order to provide an AV service, access or movement to a desired network is not supported by a UPnP or DLNA action. Therefore, additional network access management may be required, causing inconvenience to the user.

Moreover, even though the user desires to be provided with the AV service without detecting information on a network to which a device of the user belongs, the use may experience the inconvenience of detecting the information on the network when a multiple network environment is applied to the current UPnP or DLNA technology.

DISCLOSURE OF THE INVENTION

Technical Problem

Embodiments provide a control point device for determining whether a DLNA operation such as a media service and an UPnP operation are completely unavailable due to suspension of operation of a control target device, or the control target device exists in another network, and provide a control target device for enabling such operation of the control point device.

Embodiments also provide a control point device for easily detecting a network to which a control target device belongs, and provide a control target device for enabling such operation of the control point device.

Embodiments also provide a control point device and a control target device for reducing or eliminating inconvenience of network access management by a user.

Embodiments also provide a control point device and a control target device for reducing or eliminating inconvenience of detecting, by a user, information on a network to which devices belong.

Technical Solution

In one embodiment, an operating method of a control target device controlled by a control point device in a multiple network includes connecting to a first network, receiving, from the control point device, a request message for requesting movement to a second network, transmitting a network movement advertising message to a control point device of the first network, disconnecting from the first network, and connecting to the second network.

In another embodiment, an operating method of a control point device in a multiple network includes collecting device information on a plurality of control target devices connected to a plurality of networks, receiving selection information on one of the plurality of control target devices, checking whether a network of the one control target device is the same as a network of the control point device, and moving to the network of the one control target device when the network of the one control target device is different from the network of the control point device.

In further another embodiment, a control target device controlled by a control point device includes a communication module, and a control unit, wherein, when the control unit receives, from the control point device through the communication module, a message for requesting movement to a second network during connection to a first network, the control unit transmits, to a control point device of the first network through the communication module, a network movement advertising message, disconnects from the first network, and connects to the second network through the communication module.

In still further another embodiment, a control point device includes a communication module, and a control unit, wherein the control unit collects, through the communication module, device information on a plurality of control target devices connected to a plurality of networks, and when a network of one control target device selected from the plurality of control target devices is different from a network of the control point device, the control unit connects to the network of the one control target device through the communication module.

Advantageous Effects

A control point device according to an embodiment can determine whether a DLNA operation such as a media service is completely unavailable due to suspension of operation of a control target device, or the control target device exists in another network.

A control point device according to another embodiment can easily detect a network to which a control target device belongs.

A control point device and a control target device according to another embodiment can reduce or eliminate inconvenience of network access management by a user.

A control point device and a control target device according to another embodiment can reduce or eliminate inconvenience of detecting, by a user, information on a network to which devices belong.

BRIEF DESCRIPTION OF THE DRAWINGS

FIG. 7 illustrates a display unit of a control point device which displays information according to an embodiment.

FIG. 8 illustrates a display unit of the control point device which displays information according to another embodiment.

FIG. 9 illustrates a display unit of the control point device which displays information according to another embodiment.

FIG. 10 illustrates a display unit of the control point device which displays information according to another embodiment.

FIG. 14 is a diagram illustrating a network topology for performing an AV service method according to another embodiment.

FIG. 15 is a diagram illustrating a network topology for performing an AV service method according to another embodiment.

MODE FOR CARRYING OUT THE INVENTION

Hereinafter, a mobile terminal related to an embodiment will be described in detail with reference to the accompanying drawings. In the following description, the terms "module" and "unit" for referring to elements are assigned and interchangeably used considering the convenience of description, and thus, the terms per se do not necessarily represent different meanings or functions.

A network topology according to an embodiment will be described with reference to FIG. 1.

Figure 1:
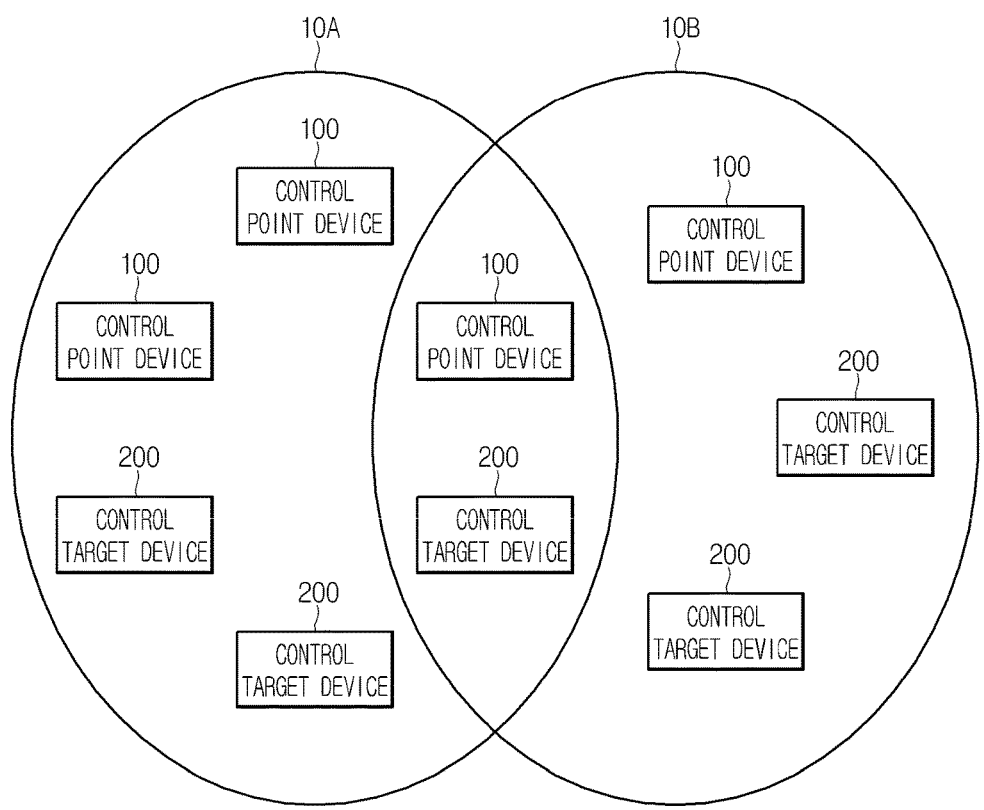
FIG. 1 is a diagram illustrating a network topology according to an embodiment.

FIG. 1 is a diagram illustrating the network topology according to an embodiment.

A plurality of networks may exist in a home network space. Herein, it is assumed that two networks 10A and 10B exist in the home network space.

At least one control point device 100 may be connected to the network 10A, at least one control point device 100 may be connected to the network 10B, at least one control target device 200 may be connected to the network 10A, and at least one control target device 200 may be connected to the network 10B. If the control point device 100 has two or more communication modules, the control point device 100 may be connected to both the networks 10A and 10B. If the control target device 200 has two or more communication modules, the control target device 200 may be connected to both the networks 10A and 10B.

The control point device 100 only connected to the network 10A may not recognize or control the control target device 200 connected to the network 10B. Similarly, the control point device 100 only connected to the network 10B may not recognize or control the control target device 200 connected to the network 10A.

A network movement method of the control target device 200 according to an embodiment will be described with reference to FIG. 2.

Figure 2:
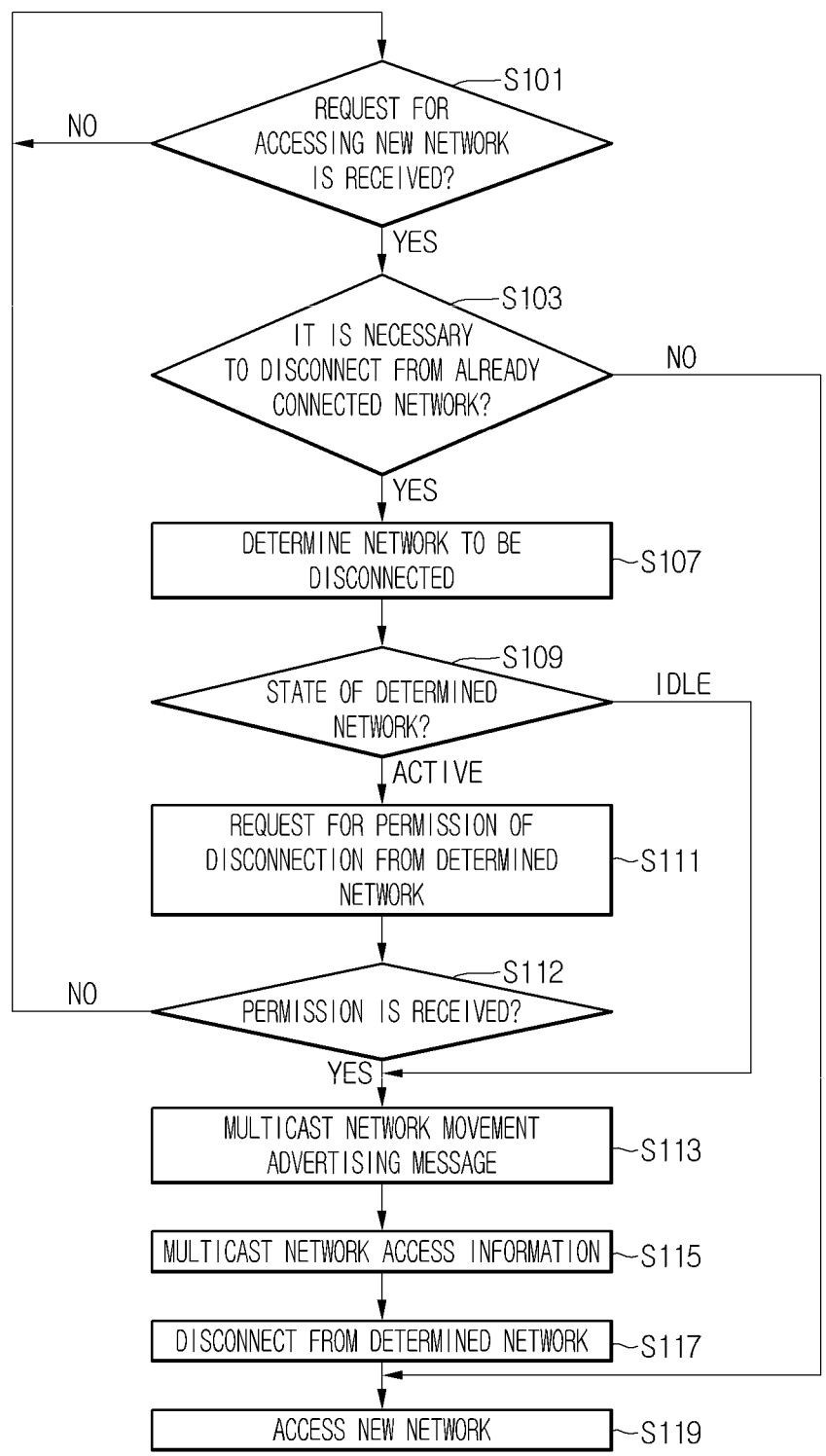
FIG. 2 is a flowchart illustrating a method of operating a control target device according to an embodiment.

FIG. 2 is a flowchart illustrating a method of operating the control target device according to an embodiment.

Here, it is assumed that the control target device 200 is connected to n number of networks (n is a natural number).

When the control target device 200 receives, from the control point device 100, a request to access (connect to) the new network 10B (operation S101), the control target device 200 checks whether it is necessary to be disconnected from one of networks to which the control target device 200 is connected in order to access the network 10B (operation S103). For example, if the control target device 200 has (n+1) number of communication modules, i.e., if the control target device 200 has an available communication module, the network disconnection for accessing the new network 10B may not be necessary. However, if the control target device 200 has n number of communication modules, i.e., if all communication modules of the control target device 200 are unavailable, the network disconnection for accessing the new network 10B may be required.

If the disconnection from one of the networks is not necessary, the control target device 200 accesses (connects to) the new network 10B through the available communication module (operation S119).

On the contrary, if the disconnection from one of the networks is not necessary, the control target device 200 determines a network from which the control target device 200 is to be disconnected (operation S107).

In one embodiment, when the request for access to the new network 10B is provided from the control point device 100, the control target device 200 may determine to disconnect from a network from which the request is provided.

In one embodiment, when the request for access to the new network 10B is provided from a user without the intervention of the control point device 100, the control target device 200 may determine to disconnect from a network where service provision is not performed. For example, the control target device 200 may determine to disconnect from a network that does not provide an AV service or does not receive the AV service.

If a plurality of networks are used for the AV service, or if the plurality of networks are not used for the AV service, the control target device 200 may determine, on the basis of a network type, to disconnect from one of the plurality of networks. For example, the control target device 200 may have network disconnection priority information according to the network type. The network type may correspond to Wi-Fi or Wi-Fi P2P. Since the Wi-Fi P2P may be a network for a temporary service such as the AV service, a Wi-Fi network may have priority of disconnection over the Wi-Fi P2P network. Therefore, when both the Wi-Fi network and the Wi-Fi P2P network are used for the service, or both the Wi-Fi network and the Wi-Fi P2P network are not used for the service, the control target device 200 may determine to disconnect from the Wi-Fi network according to the network disconnection priority information.

In FIG. 2, it is assumed that the control target device 200 determines to disconnect from the network 10A.

The control target device 200 checks a state of a communication module connected to the network 10A (operation S109).

If the communication module, which is connected to the network 10A determined to be disconnected from the control target device 200, is in an active state, i.e. if the control target device 200 provides the AV service through the network 10A, the control target device 200 requests permission from the relevant control point device 100 (operation S111). A digital media server (DMS) may request permission from a digital media player (DMP) to which the DMS provides AV content. The DMS and a digital media renderer (DMR) may request permission from a digital media controller (DMC) that controls the DMS and the DMR.

When the network 10A determined to be disconnected from the control target device 200 is in an idle state (operation S109), or when the control target device 200 receives permission (operation S112), the control target device 200 multicasts, before disconnection from the network, a network movement advertising message to the control point device 100 on the network (operation S113). That is, when the control target device 200 disconnects from the network 10A and moves to the other network 10B, the control target device 200 multicasts, to the control point device 100 on the network 10A, the network movement advertising message that is different from a bye-bye message that represents network connection termination. Therefore, the control point device 100 which is connected to the network 10A but is not connected to the network 10B may determine existence of the control target device 200 connected to the network 10B, and may control the control target device 200 connected to the network 10B when it moves to the network 10B. The control target device 200 may multicast both a network connection termination message and the network movement advertising message, or may multicast the network movement advertising message instead of the network connection termination message.

Thereafter, the control target device 200 multicasts, to all control point devices 100 on the determined network, network access information (NAI) on the network 10B to move to (operation S115). When the control target device 200 disconnects from the network 10A and moves to the other network 10B, the control target device 200 may multicast, to the control point device 100 on the network 10A, maximal information on the network 10B to move to. Therefore, the control point device 100 which is connected to the network 10A but is not connected to the network 10B may easily and quickly detect the information on the network 10B to which the control target device 200 newly accesses. In this manner, the control point device 100 may easily and quickly detect and move to a network to which the control target device 200 belongs but the control point device 100 does not belong, in order to control the control target device 200.

The NAI may include at least one of a network type, a network identifier, channel information, and authentication information. For example, the network type may be set to be Wi-Fi or Wi-Fi P2p. The network identifier may be an access point identifier or a service set identifier (SSID) of a network. The channel information may include an RF channel number in an ISM band. The authentication information may include at least one of credentials, a WEP key, and a WPA key. The content or level of the NAI may vary with a network movement method.

The control target device 200 may transmit the network movement advertising message and the NAI as one message or different messages. A new message may be defined to transmit the network movement advertising message and the NAI, or the network movement advertising message and the NAI may be added to an established message.

After the control target device 200 multicasts the network movement advertising message and the NAI, the control target device 200 is disconnected from the network 10A (operation S117) and connected to the new network 10B (operation S119).

A device discovery information (DDI) advertising method of the control target device 200 according to an embodiment will be described with reference to FIG. 3.

Figure 3:
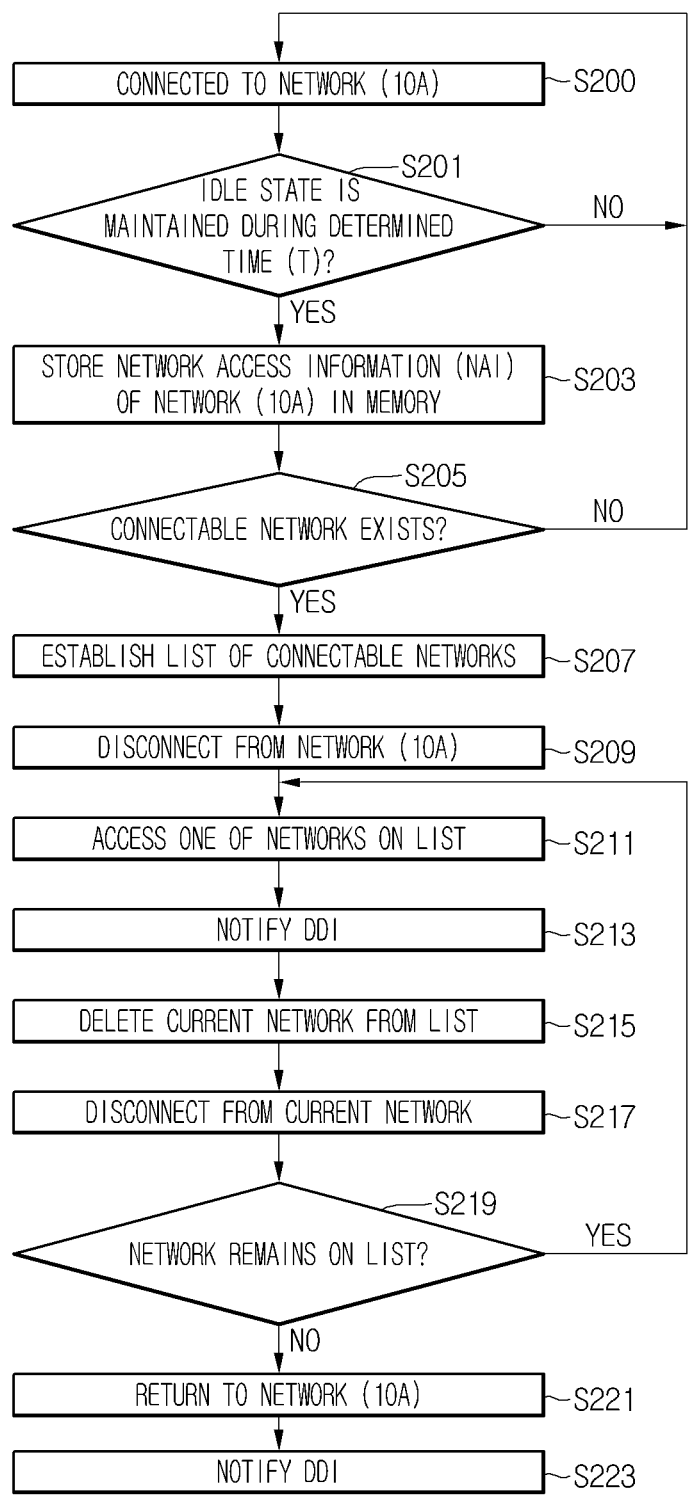
FIG. 3 is a flowchart illustrating a notification method of the control target device in a multiple network according to an embodiment.

FIG. 3 is a flowchart illustrating a multi-network advertising method of the control target device according to an embodiment.

In FIG. 3, it is assumed that the control target device 200 is connected to the network 10A (operation S200).

If the control target device 200 remains in an idle state during a determined time T (operation S201), the control target device 200 stores the NAI of the network 10A in a memory in order to return to the network 10A after moving to another network (operation S203). Since the control target device 200 may leave the current network 10A for the multi-network advertising, it is checked whether the idle state is maintained for the determined time T in order to minimize degradation of user experience (UX). The NAI may include at least one of a network type, a network identifier, channel information, and authentication information.

The control target device 200 checks whether the control target device 200 has the NAI of another network so as to check whether connectable networks exist (operation S205).

If the connectable networks exist, the control target device 200 establishes a list of the connectable networks (operation S207). If the list contains too many networks, a time taken for the multi-network advertising becomes longer. Thus, a maximal number of networks included in the list may be set. For example, the maximal number of the networks included in the list may be set to be 1 so as to minimize the degradation of the UX. Alternatively, the maximal number of the networks included in the list may be set to be a natural number greater than 1.

Thereafter, the control target device 200 is disconnected from the network 10A (operation S209).

The control target device 200 accesses (connects to) one of the connectable networks on the list (operation S211).

The control target device 200 advertises, through multicast, device discovery information to the control point devices 100 of the newly connected network (operation S213). The device discovery information is device information about the control target device 200 which is basically collected by the control point device 100 in the UPnP and DLNA technologies. The device discovery information may include at least one of a device type, a friendly name, a manufacturer, a model description, a model name, a device address, an interface address, a universally unique identifier, and a service list.

Thereafter, the control target device 200 deletes the current network from the list (operation S215) and disconnects from the current network (operation S217).

The control target device 200 checks whether a network remains on the list (operation S219).

If a network remains on the list, the control target device 200 repeats operations S211 to S219. That is, the control target device 200 accesses each of a plurality of networks on the list and performs the advertisement of the device discovery information.

If no network remains on the list, the control target device 200 returns to the network 10A (operation S221).

The control target device 200 advertises the device discovery information to the control point devices 100 of the network 10A (operation S223). In this manner, the control target device 200 may introduce itself to a control point device newly connected to the network 10A while advertising the device discovery information to a plurality of networks. The control target device 200 may also introduce itself to a control point device that has deleted the control target device 200 from a target device list while advertising the device discovery information to a plurality of networks.

In this manner, the control point device may acquire information on the control target device which belongs to a network to which the control point device does not belong.

A network connection termination notifying method of the control target device 200 according to an embodiment will be described with reference to FIG. 4.

Figure 4:
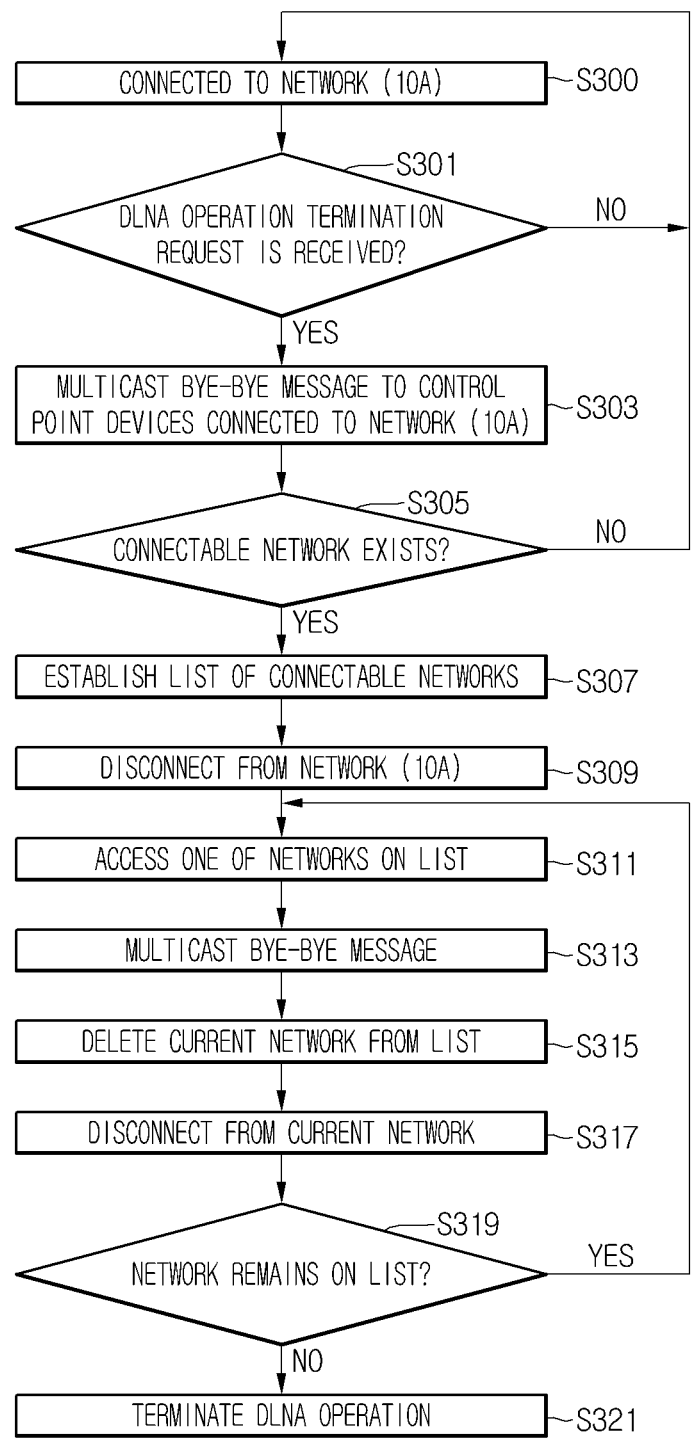
FIG. 4 is a flowchart illustrating a network connection termination notifying method of the control target device according to an embodiment.

FIG. 4 is a flowchart illustrating the network connection termination notifying method of the control target device according to an embodiment.

In FIG. 4, it is assumed that the control target device 200 is connected to the network 10A (operation S300).

When the control target device 200 receives a DLNA operation termination request from the user or the control point device (operation S301), the control target device 200 multicasts a bye-bye message to the control point devices connected to the network 10A (operation S303).

Thereafter, the control target device 200 checks whether the control target device 200 has the NAI of another network so as to check whether connectable networks exist (operation S305).

If no connectable network exists, the control target device 200 terminates the DLNA operation (operation S321).

If the connectable networks exist, the control target device 200 establishes a list of the connectable networks (operation S307).

Thereafter, the control target device 200 is disconnected from the network 10A (operation S309).

The control target device 200 accesses (connects to) one of the connectable networks on the list (operation S311).

The control target device 200 multicasts the bye-bye message to the control point devices 100 of the newly connected network (operation S313).

Thereafter, the control target device 200 deletes the current network from the list (operation S315) and disconnects from the current network (operation S317).

The control target device 200 checks whether a network remains on the list (operation S319).

If a network remains on the list, the control target device 200 repeats operations S311 to S319. That is, the control target device 200 accesses each of a plurality of networks on the list and multicasts the bye-bye message.

If no connectable network remains on the list, the control target device 200 terminates the DLNA operation (operation S321).

In this manner, the control point device may recognize the DLNA operation termination of the control target device which belongs to a network to which the control point device does not belong.

A multi-network discovery method of the control point device 100 according to an embodiment will be described with reference to FIG. 5.

Figure 5:
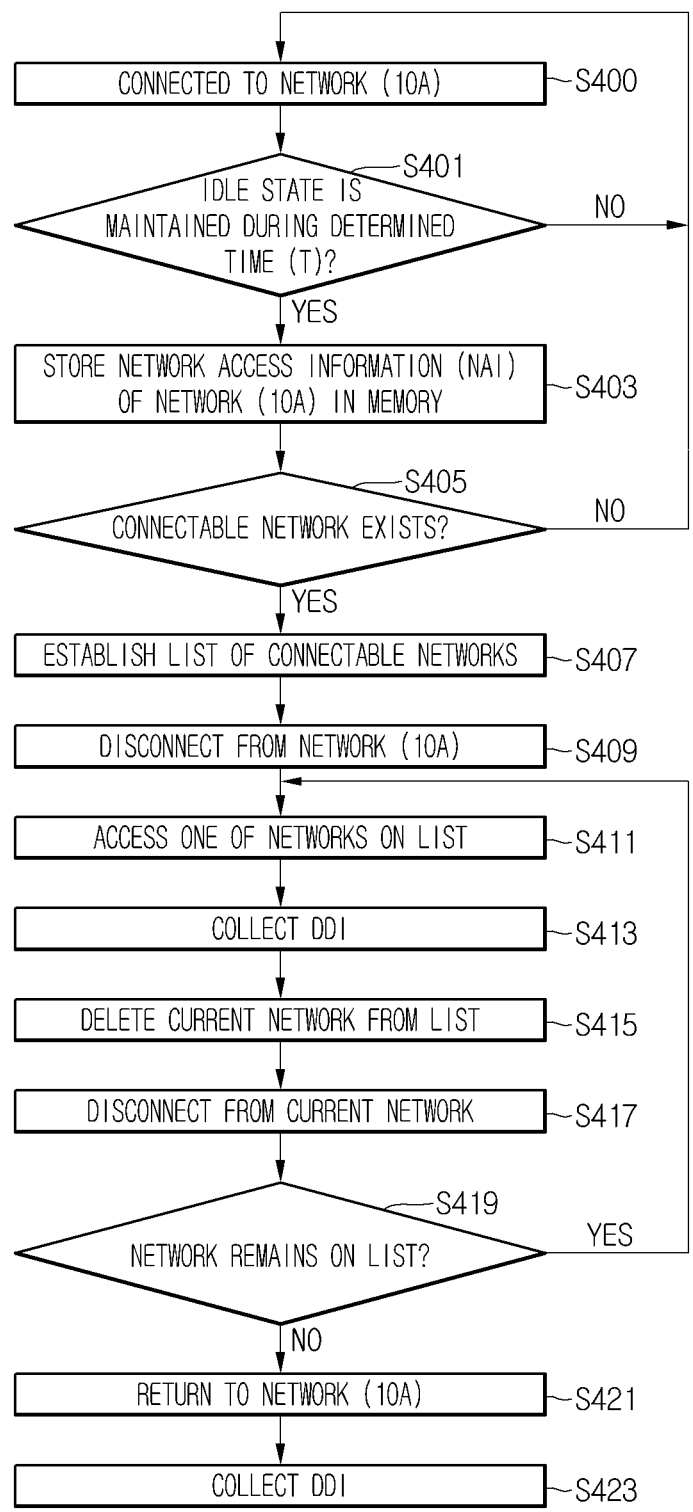
FIG. 5 is a flowchart illustrating a multi-network search method according to an embodiment.

FIG. 5 is a flowchart illustrating the multi-network discovery method according to an embodiment.

In FIG. 5, it is assumed that the control point device 100 is connected to the network 10A (operation S400).

If the control point device 100 remains in an idle state during a determined time T (operation S401), the control point device 100 stores the NAI of the network 10A in a memory in order to return to the network 10A after moving to another network (operation S403). Since the control point device 100 may leave the current network 10A for the multi-network discovery, it is checked whether the idle state is maintained for the determined time T in order to minimize the degradation of the UX. The NAI may include at least one of a network type, a network identifier, channel information, and authentication information.

The control point device 100 checks whether the control point device 100 has the NAI of another network so as to check whether connectable networks exist (operation S405).

If the connectable networks exist, the control point device 100 establishes a list of the connectable networks (operation S407). If the list contains too many networks, a time taken for the multi-network advertising becomes longer. Thus, a maximal number of networks included in the list may be set. For example, the maximal number of the networks included in the list may be set to be 1 so as to minimize the degradation of the UX. Alternatively, the maximal number of the networks included in the list may be set to be a natural number greater than 1.

Thereafter, the control point device 100 is disconnected from the network 10A (operation S409).

The control point device 100 accesses (connects to) one of the connectable networks on the list (operation S411).

The control point device 100 collects the device discovery information of the control target devices in the newly connected network (operation S413). Since the control point device 100 may recognize the information on the newly connected network, the control point device 100 may manage a control target device list including the NAI for each of the plurality of control target devices and the device discovery information for each of the plurality of control target devices. The level of the device discovery information to be collected may be limited in order to minimize the degradation of the UX by reducing the time taken for the multi-network discovery.

Thereafter, the control point device 100 deletes the current network from the list (operation S415) and disconnects from the current network (operation S417).

The control point device 100 checks whether a network remains on the list (operation S419).

If a network remains on the list, the control point device 100 repeats operations S411 to S419. That is, the control target device 200 accesses each of a plurality of networks on the list and collects the DDI.

If no network remains on the list, the control point device 100 returns to the network 10A (operation S421).

The control point device 100 collects the device discovery information of the control target devices in the network 10A (operation S423). In this manner, the control point device 100 may recognize the control target device which newly accesses the network 10A, moves to another network, or terminates the DLNA operation while advertising the device discovery information to a plurality of networks.

In this manner, the control point device may acquire information on the control target device which belongs to a network to which the control point device does not belong.

A device discovery information multicasting method of the control point device 100 according to an embodiment will be described with reference to FIG. 6.

Figure 6:
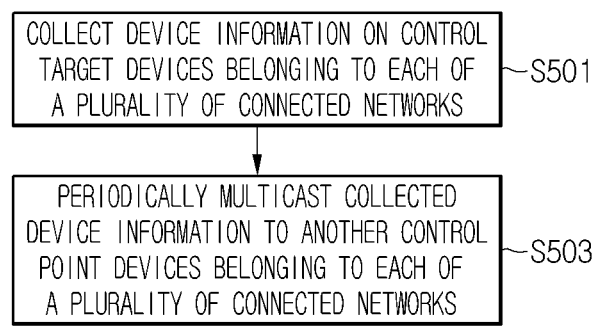
FIG. 6 is a flowchart illustrating a device discovery information multicasting method according to an embodiment.

FIG. 6 is a flowchart illustrating the device discovery information multicasting method according to an embodiment.

In FIG. 6, it is assumed that the control point device 100 is connected to a plurality of networks.

The control point device 100 collects device information of the control target devices that belong to each of the plurality of connected networks (operation S501). Here, the control point device 100 may collect the device information such as the device discovery information of the control target device, a possessed content list of the control target device, and information on the network to which the control target device belongs.

The control point device 100 periodically multicasts the collected device information to another control point devices that belong to each of the plurality of connected networks (operation S503). Since the other control point devices may also collect the device information of the networks to which the other control point devices belong, the control point device 100 may provide the device information collected thereby excepting the device information of the network to which the other control pint devices belong. In this manner, the control point device may acquire information on the control target device which belongs to a network to which the control point device does not belong.

An information display method of the control point device 100 according to an embodiment will be described with reference to FIGS. 7 to 10.

FIG. 7 illustrates a display unit of the control point device which displays information according to an embodiment.

In FIG. 7, it is assumed that the control point device 100, a first DMR having a friendly name of TV1, a second DMR having a friendly name of TV2, a first DMS having a friendly name of server1, and a second DMS having a friendly name of server2 are connected to a Wi-Fi network having an SSID of My1stNet, and the second DMS having a friendly name of server2 has image content having a content name of image001, video content having a content name of video1, video content having a content name of video2, and audio content having a content name of audio_aaa1.

When the control point device 100 receives a device list display request from the user, the control point device 100 may display the device discovery information of controllable control target devices on the display unit, as illustrated in FIG. 7(A). In particular, the control point device 100 may display a list of friendly names of the controllable target devices.

Thereafter, when the control point device 100 receives a request for displaying the possessed content list of the second DMS having the friendly name of server2, the control point device 100 may display, on the display unit, a list of names of content possessed by the second DMS that is a selected control target device, as illustrated in FIG. 7(B).

The request for displaying the possessed content list of the second DMS may be made by selecting the friendly name of the second DMS by touch.

FIG. 8 illustrates a display unit of the control point device which displays information according to another embodiment.

In FIG. 8, it is assumed that the control point device 100, the second DMR having the friendly name of TV2, and the first DMS having the friendly name of server1 are connected to the Wi-Fi network having the SSID of My1stNet. It is assumed that the first DMR having the friendly name of TV1 has been disconnected from the Wi-Fi network having the SSID of My1stNet, and has been connected to a Wi-Fi network having an SSID of My2ndNet. It is assumed that the second DMS having the friendly name of server2 has been disconnected from the Wi-Fi network having the SSID of My1stNet, and has been connected to a Wi-Fi network having an SSID of My3rdNet. It is assumed that the control point device 100 may access all of the Wi-Fi network having the SSID of My1stNet, the Wi-Fi network having the SSID of My2ndNet, and the Wi-Fi network having the SSID of My3rdNet. It is assumed that the second DMS having the friendly name of server2 possesses the image content having the content name of image001, the video content having the content name of video1, the video content having the content name of video2, and the audio content having the content name of audio_aaa1.

When a control point device to which an embodiment is not applied receives the device list display request from the user, the control point device may display the device discovery information of target devices connected to a network to which the control point device belongs, but may not display control target devices connected to a network to which the control point device does not belong but will possibly move, as illustrated in FIG. 8(A).

As illustrated in FIG. 8(B), the control point device to which an embodiment is not applied may not detect the second DMS, and thus may not display a list of content possessed by the second DMS.

FIG. 9 illustrates a display unit of the control point device which displays information according to another embodiment.

In FIG. 9, it is assumed that states of devices are the same as described above with reference to FIG. 8.

When the control point device 100 to which an embodiment is applied receives the device list display request from the user, the control point device 100 may display the device list including not only the DDI of the control target devices connected to a network to which the control point device 100 belongs but also the DDI of the control target devices connected to a network to which the control point device 100 does not belong, as illustrated in FIG. 9(A). The control point device 100 may also display the NAI by the side of the displayed list of the control target devices. More specifically, the control point device 100 may display the friendly name of the control target device and may display a description, by the side of the friendly name, indicating that the control target device is connected to a network which is different from a network to which the control point device 100 belongs. The control point device 100 may also display the NAI of the network to which the control target device corresponding to the displayed name belongs.

Thereafter, when the control point device 100 receives a request for displaying the possessed content list of the second DMS having the friendly name of server2, the control point device 100 may display, on the display unit, a list of names of content possessed by the second DMS that is a selected control target device, as illustrated in FIG. 9(B).

FIG. 10 illustrates a display unit of the control point device which displays information according to another embodiment.

In FIG. 10(A), it is assumed that the control point device 100, the second DMR having the friendly name of TV2, and the first DMS having the friendly name of server1 are connected to the Wi-Fi network having the SSID of My1stNet. It is assumed that the first DMR having the friendly name of TV1 has been disconnected from the Wi-Fi network having the SSID of My1stNet, and has been connected to the Wi-Fi network having the SSID of My2ndNet. It is assumed that the second DMS having the friendly name of server2 has been disconnected from the Wi-Fi network having the SSID of My1stNet, and has been connected to the Wi-Fi network having the SSID of My3rdNet.

When the control point device 100 receives the device list display request from the user, the control point device 100 may display the device list including not only the DDI of the control target devices connected to a network to which the control point device 100 belongs but also the DDI of the control target devices connected to a network to which the control point device 100 does not belong, as illustrated in FIG. 10(A). That is, since the second DMR and the first DMS belong to the same network as that to which the control point device 100 belongs, the control point device 100 displays the second DMR and the first DMS without the NAI. Since the network to which the first DMR belongs is different from that to which the control point device 100 belongs, the control point device 100 displays the device list including the DDI of the first DMR together with the NAI about the network to which the first DMR belongs. Since the network to which the second DMS belongs is different from that to which the control point device 100 belongs, the control point device 100 displays the device list including the DDI of the second DMS together with the NAI about the network to which the second DMS belongs.

When the first DMR having the friendly name of TV1 is selected, the control point device 100 requests, via a GUI, permission for movement to the network to which the first DMR belongs before moving thereto, as illustrated in FIG. 10(B).

When a request for a network is received, the control point device 100 disconnects from the Wi-Fi network having the SSID of My1stNet, and accesses the network to which the first DMR belongs.

Thereafter, as illustrated in FIG. 10(C), the control point device 100 displays, on the display unit, a list of controllable devices. The control point device 100 may display not only a list of the control target devices connected to a network to which the control point device 100 belongs but also a list of the control target devices connected to a network to which the control point device 100 does not belong. That is, since the first DMR and the control point device 100 belong to the same network, the control point device 100 displays the first DMR without the NAI. Since the network to which the second DMR belongs is different from that to which the control point device 100 belongs, the control point device 100 displays the second DMR as one of devices on the device list together with the NAI about the network to which the second DMR belongs. Since the network to which the first DMS belongs is different from that to which the control point device 100 belongs, the control point device 100 displays the first DMS as one of devices on the device list together with the NAI about the network to which the first DMS belongs. Since the network to which the second DMS belongs is different from that to which the control point device 100 belongs, the control point device 100 displays the second DMS as one of devices on the device list together with the NAI about the network to which the second DMS belongs.

AV service methods according to various embodiments will be described with reference to FIGS. 11 to 16.

In FIGS. 11 to 16, a digital media player 100A and a digital media controller 100B are referred to as the control point device, and a digital media server 200A and a digital media renderer 200B are referred to as the control target device 200.

Figure 11:
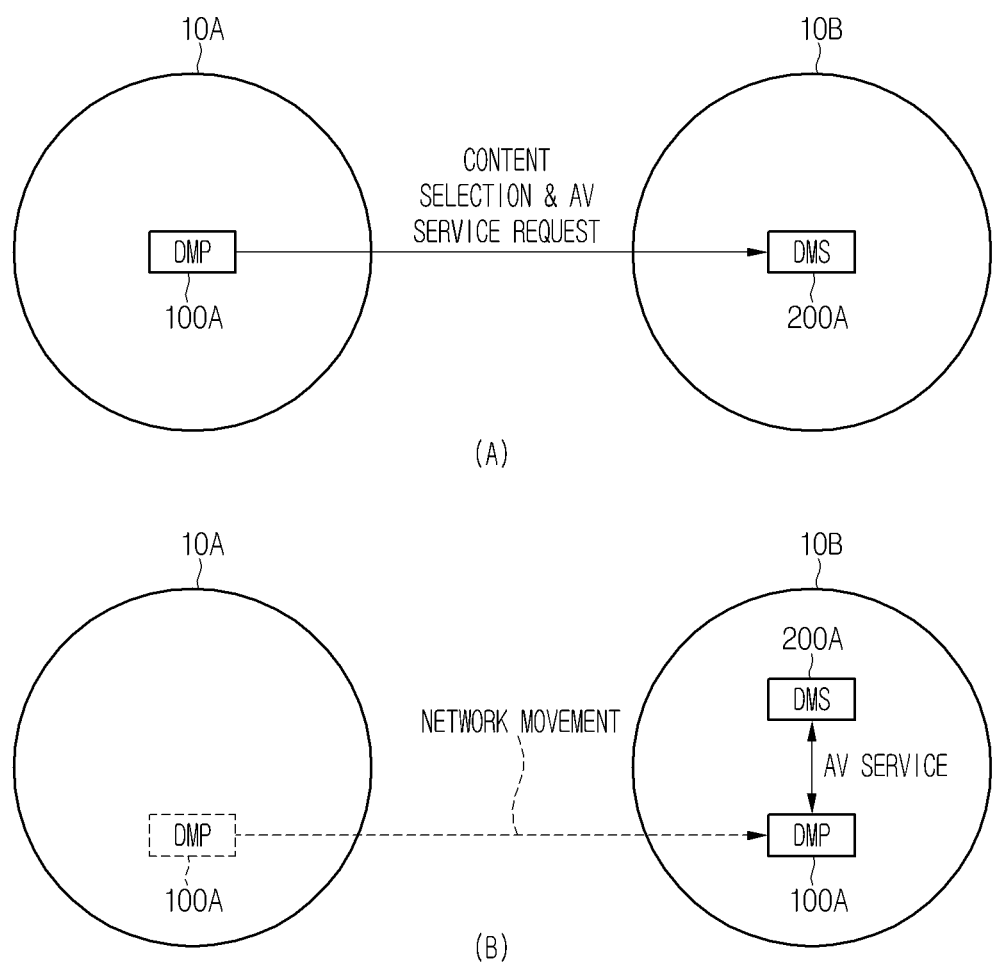
FIG. 11 is a diagram illustrating a network topology for performing an AV service method according to an embodiment.
Figure 12:
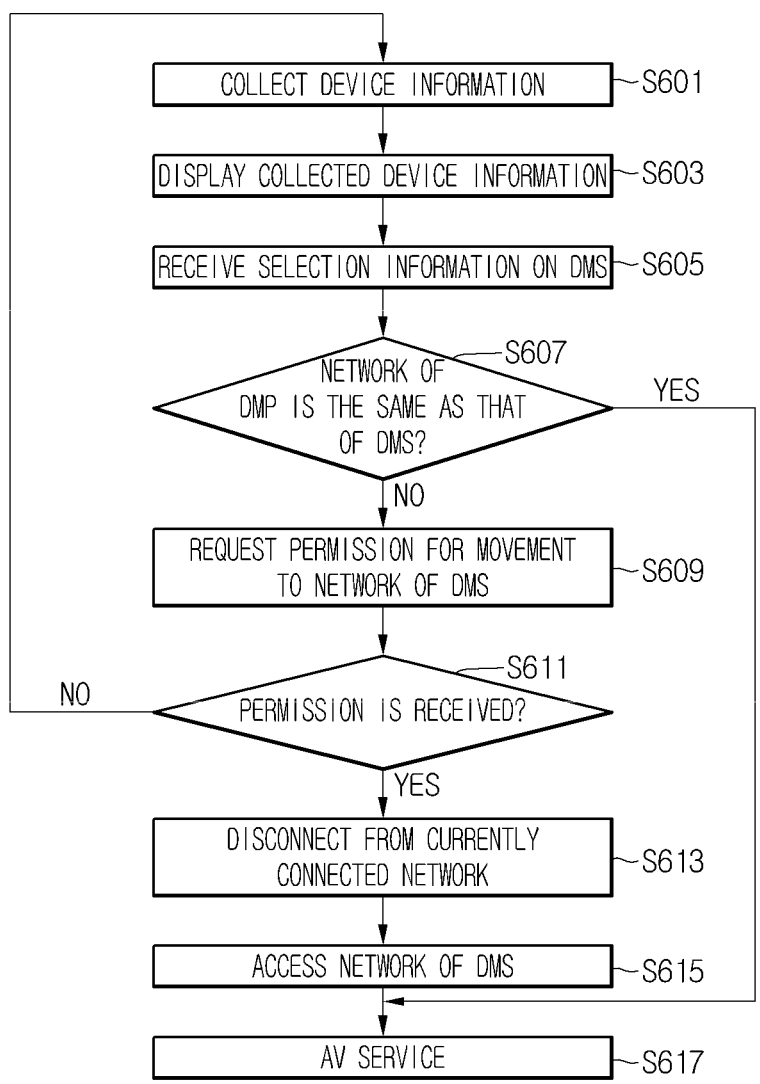
FIG. 12 is a flowchart illustrating the AV service method according to an embodiment.

FIGS. 11 and 12 relate to a 2-box model, and FIGS. 13 to 16 relate to a 3-box model.

FIG. 11 is a diagram illustrating a network topology for performing an AV service method according to an embodiment.

As illustrated in FIG. 11(A), the digital media player 100A is connected to the network 10A, and the digital media server 200A is connected to the network 10B. The digital media player 100A may select content in the digital media server 200 connected to the network 10B to which the digital media player 100A does not belong.

In this case, as illustrated in FIG. 11(B), the digital media player 100A may move to the network 10B to which the digital media server 200A belongs and may receive the AV service from the digital media server 200A.

FIG. 12 is a flowchart illustrating the AV service method according to an embodiment.

According to the above-mentioned various embodiments, the digital media player 100A collects the device information on the control target devices connected to the network to which the digital media player 100A belongs and the device information on the control target devices connected to a network to which the digital media player 100A does not belong (operation S601).

More specifically, the digital media player 100A may collect, through a discovery process, the device information on the control target devices on the network to which the digital media player 100A belongs. The digital media player 100A may collect the information multicast by the control target devices that perform the process illustrated in FIG. 2 or 4. The digital media player 100A may collect, through the process illustrated in FIG. 5, the device information on the control target devices on a network to which the digital media player 100A does not belong. The digital media player 100A may collect, from the control point device that performs the process illustrated in FIG. 6, the device information on the control target devices on a network to which the digital media player 100A does not belong.

Thereafter, the digital media player 100A displays the device information collected using the various methods illustrated in FIGS. 7 to 10 on the display unit through a user interface (operation S603).

The digital media player 100A receives, through a displayed graphic user interface, selection information on the digital media server 200A or selection information on the content of the digital media server 200A (operation S605).

The digital media player 100A determines whether the network of the selected digital media server 200A is the same as a network of the digital media player 100A (operation S607).

If the network of the selected digital media server 200A is the same as a network of the digital media player 100A, the digital media player 100A receives selected content from the selected digital media server 200A and plays the content (operation S617).

If the network of the selected digital media server 200A is not the same as a network of the digital media player 100A, the digital media player 100A requests, through the graphic user interface, permission for movement to the network of the selected digital media server 200A, as illustrated in FIG. 10(B) (operation S609).

When the permission for movement to the network of the selected digital media server 200A is received through the graphic user interface (operation S611), the digital media player 100A disconnects from the currently connected network (operation S613) and accesses the network of the selected digital media server 200A (operation S615).

Thereafter, the digital media player 100A receives the selected content from the selected digital media server 200A and plays the content (operation S617).

Figure 13:
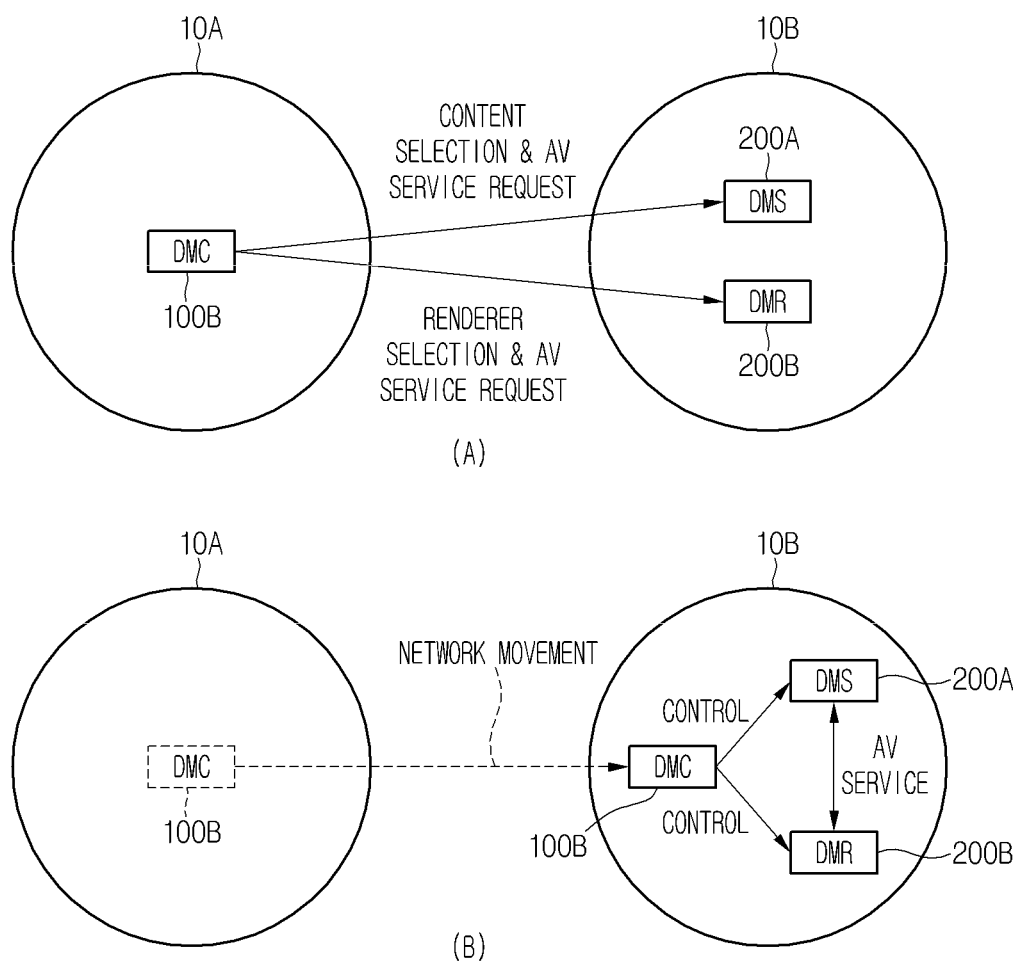
FIG. 13 is a diagram illustrating a network topology for performing an AV service method according to another embodiment.

FIG. 13 is a diagram illustrating a network topology for performing an AV service method according to another embodiment.

As illustrated in FIG. 13(A), the digital media controller 100B is connected to the network 10A, and the digital media server 200A and the digital media renderer 200B are connected to the network 10B. The digital media controller 100B may select the content in the digital media server 200A connected to the network 10B to which the digital media controller 100B does not belong, and may select the digital media renderer 200B connected to the network 10B to which the digital media controller 100B does not belong, as a playback device of the selected content.

In this case, as illustrated in FIG. 13(B), the digital media controller 100B may move to the network 10B to which the digital media server 200A and the digital media renderer 200B belong, so as to instruct the digital media server 200A to provide the selected content to the digital media renderer 200B and instruct the digital media renderer 200B to play the provided content. Thereafter, the digital media controller 100B may additionally control the digital media server 200A and the digital media renderer 200B regarding the AV service.

FIG. 14 is a diagram illustrating a network topology for performing an AV service method according to another embodiment.

As illustrated in FIG. 14(A), the digital media controller 100B and the digital media renderer 200B are connected to the network 10A, and the digital media server 200A is connected to the network 10B. The digital media controller 100B may select the content in the digital media server 200 connected to the network 10B to which the digital media controller 100B does not belong, and may select the digital media renderer 200B connected to the network 10A to which the digital media controller 100B belongs, as a playback device of the selected content.

In this case, as illustrated in FIG. 14(B), the digital media controller 100B transmits, to the digital media renderer 200B, a network movement request message for asking the digital media renderer to move to the network 10B.

Then, as illustrated in FIG. 14(C), the digital media renderer 200B and the digital media controller 100B move to the network 10B to which the digital media server 200A belongs. Here, the digital media renderer 200B may perform the process illustrated in FIG. 2. The digital media controller 100B may instruct the digital media server 200A to provide the selected content to the digital media renderer 200B, and may instruct the digital media renderer 200B to play the provided content. Thereafter, the digital media controller 100B may additionally control the digital media server 200A and the digital media renderer 200B regarding the AV service.

FIG. 15 is a diagram illustrating a network topology for performing an AV service method according to another embodiment.

As illustrated in FIG. 15(A), the digital media controller 100B and the digital media server 200A are connected to the network 10A, and the digital media renderer 200B is connected to the network 10B. The digital media controller 100B may select the content in the digital media server 200A connected to the network 10A to which the digital media controller 100B belongs, and may select the digital media renderer 200B connected to the network 10B to which the digital media controller 100B does not belong, as a playback device of the selected content.

In this case, as illustrated in FIG. 15(B), the digital media controller 100B transmits, to the digital media server 200A, a network movement request message for asking the digital media server to move to the network 10B.

Then, as illustrated in FIG. 15(C), the digital media server 200A and the digital media controller 100B move to the network 10B to which the digital media renderer 200B belongs.

Here, the digital media server 200A may perform the process illustrated in FIG. 2. The digital media controller 100B may instruct the digital media server 200A to provide the selected content to the digital media renderer 200B, and may instruct the digital media renderer 200B to play the provided content. Thereafter, the digital media controller 100B may additionally control the digital media server 200A and the digital media renderer 200B regarding the AV service.

Figure 16:
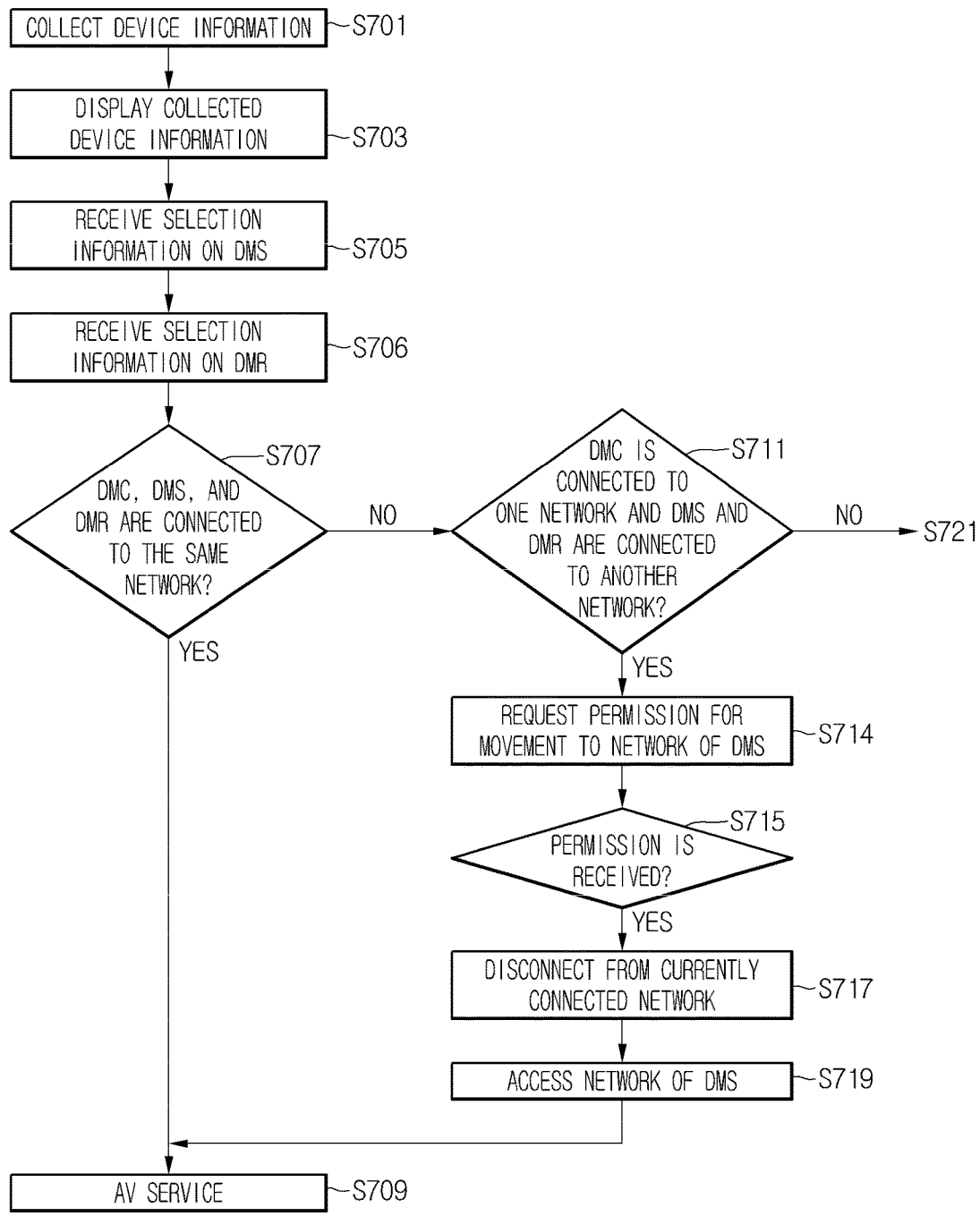
FIGS. 16 and 17 are flowchart illustrating an AV service method according to another embodiment.
Figure 17:
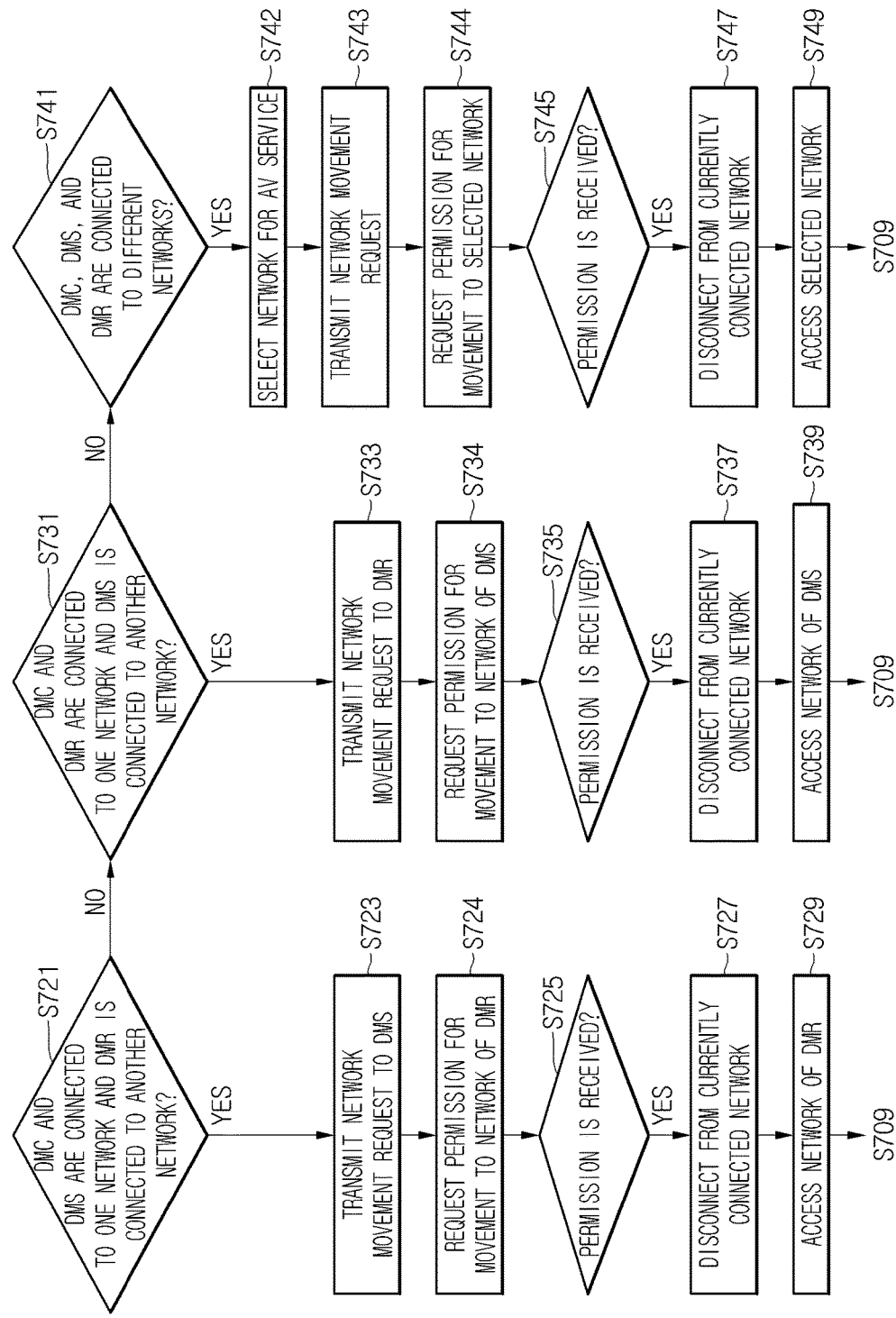

FIGS. 16 and 17 are flowcharts illustrating an AV service method according to another embodiment.

According to the above-mentioned various embodiments, the digital media controller 100B collects the device information on the control target devices connected to the network to which the digital media controller 100B belongs and the device information on the control target devices connected to a network to which the digital media controller 100B does not belong (operation S701).

More specifically, the digital media controller 100B may collect, through a discovery process, the device information on the control target devices on the network to which the digital media controller 100B belongs. The digital media controller 100B may collect the information multicast by the control target devices that perform the process illustrated in FIG. 2 or 4. The digital media player 100A may collect, through the process illustrated in FIG. 5, the device information on the control target devices on a network to which the digital media player 100A does not belong. The digital media player 100A may collect, from the control point device that performs the process illustrated in FIG. 6, the device information on the control target devices on a network to which the digital media player 100A does not belong.

Thereafter, the digital media controller 100B displays the device information collected using the various methods illustrated in FIGS. 7 to 10 on the display unit through the user interface (operation S703).

The digital media controller 100B receives, through a displayed graphic user interface, selection information on the digital media server 200A or selection information on the content of the digital media server 200A (operation S705).

The digital media controller 100B receives, through the displayed graphic user interface, selection information on the digital media renderer 200B (operation S706).

The digital media controller 100B identifies networks to which the digital media controller 100B, the selected digital media server 200A, and the selected digital media renderer 200B belong respectively.

If the digital media controller 100B, the selected digital media server 200A, and the selected digital media renderer 200B are connected to the same network (operation S707), the digital media controller 100B controls the digital media server 200A selected to initiate the AV service and the selected digital media renderer 200B (operation S709). Then, the selected digital media server 200 provides the selected content to the selected digital media renderer 200B, and the selected digital media renderer 200B plays the provided content.

If the digital media controller 100B is connected to one network and the selected digital media server 200A and the selected digital media renderer 200B are connected to another network (operation S711), the digital media controller 100B requests, through the graphic user interface, permission to movement to the network of the selected digital media server 200A and the selected media renderer 200B, as illustrated in FIG. 10(B) (operation S714).

When the permission for movement to the network of the selected digital media server 200A and the selected digital media renderer 200B is received through the graphic user interface (operation S715), the digital media controller 100B disconnects from the currently connected network (operation S717) and accesses (connects to) the network of the selected digital media server 200A (operation S719).

Thereafter, the digital media controller 100B controls the digital media server 200A selected to initiate the AV service and the selected digital media renderer 200B (operation S709).

If the digital media controller 100B and the selected digital media server 200A are connected to one network and the selected digital media renderer 200B is connected to another network (operation S721), the digital media controller 100B transmits, to the digital media server 200A, a network movement request message for asking the digital media server 200A to move to the network of the selected digital media renderer 200B (operation S723).

The digital media controller 100B requests, through the graphic user interface, permission for movement to the network of the selected digital media renderer 200B, as illustrated in FIG. 10(B) (operation S724).

When the permission for movement to the network of the selected digital media renderer 200B is received through the graphic user interface (operation S725), the digital media controller 100B disconnects from the currently connected network (operation S727) and accesses (connects to) the network of the selected digital media renderer 200B (operation S729).

Thereafter, the digital media controller 100B controls the digital media server 200A selected to initiate the AV service and the selected digital media renderer 200B (operation S709).

If the digital media controller 100B and the selected digital media renderer 200B are connected to one network and the selected digital media server 200A is connected to another network (operation S731), the digital media controller 100B transmits, to the selected digital media renderer 200B, a network movement request message for asking the digital media renderer 200B to move to the network of the selected digital media server 200A (operation S723).

The digital media controller 100B requests, through the graphic user interface, permission for movement to the network of the selected digital media server 200A, as illustrated in FIG. 10(B) (operation S734).

When the permission for movement to the network of the selected digital media server 200A is received through the graphic user interface (operation S735), the digital media controller 100B disconnects from the currently connected network (operation S737) and accesses (connects to) the network of the selected digital media server 200A (operation S739).

Thereafter, the digital media controller 100B controls the digital media server 200A selected to initiate the AV service and the selected digital media renderer 200B (operation S709).

If the digital media controller 100B, the selected digital media server 200A, and the selected digital media renderer 200B are connected to different networks (operation S741), the digital media controller 100B selects, for the AV service, one of the network of the selected digital media server 200A and the network of the selected digital media renderer 200B (operation S742).

When the network of the selected digital media server 200A is selected for the AV service, the digital media controller 100B transmits, to the selected digital media renderer 200B, a network movement request message for asking the digital media renderer 200B to move to the network of the selected digital media server 200A. When the network of the selected digital media renderer 200B is selected for the AV service, the digital media controller 100B transmits, to the selected digital media server 200A, the network movement request message for asking the digital media server 200A to move to the network of the selected digital media renderer 200B (operation S743).

The digital media controller 100B requests, through the graphic user interface, permission for movement to the selected network, as illustrated in FIG. 10(B) (operation S744).

When the permission for movement to the selected network is received (operation S745), the digital media controller 100B disconnects from the currently connected network (operation S747) and accesses (connects to) the selected network (operation S749).

Thereafter, the digital media controller 100B controls the digital media server 200A selected to initiate the AV service and the selected digital media renderer 200B (operation S709).

Hereinafter, an infrastructure network (ISN) as a multiple network and network movement methods of the DMP, DMC, DMS, and DMR in an environment where a Wi-Fi direct network (WFDN) is operated will be described with reference to FIGS. 18 to 25.

Figure 18:
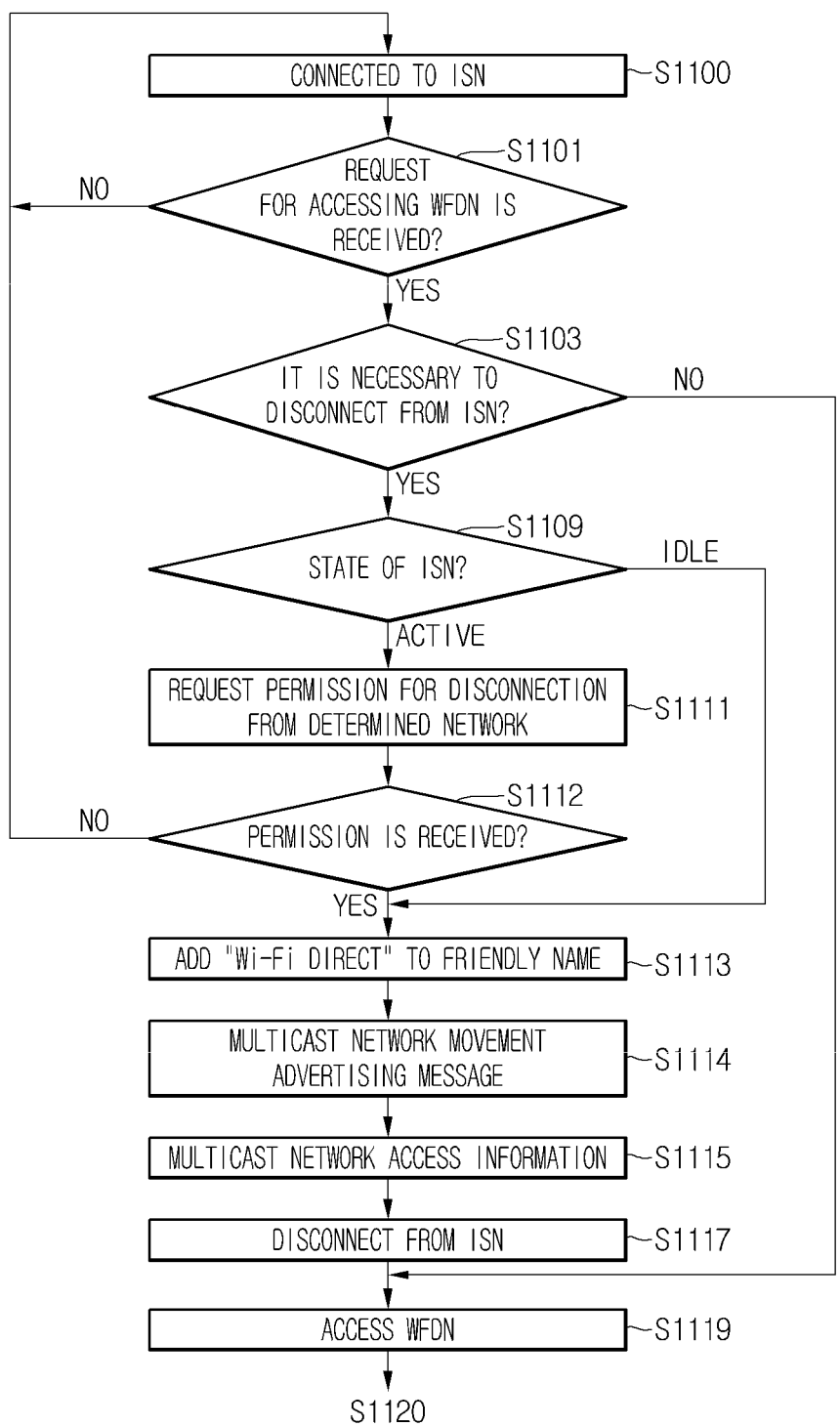
FIGS. 18 and 19 are flowcharts illustrating a network movement method of a digital media server in a 2-box model according to an embodiment.
Figure 19:
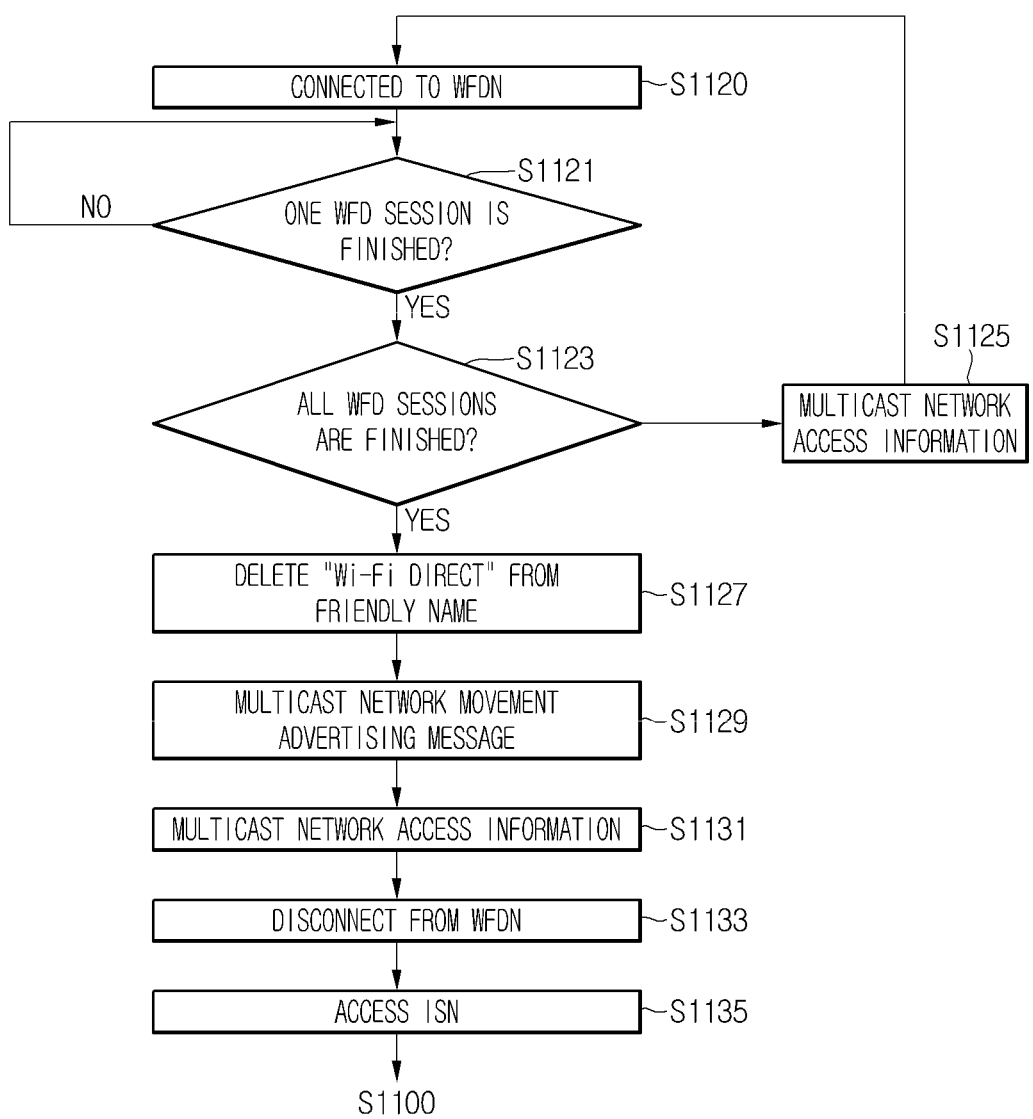

FIGS. 18 and 19 are flowcharts illustrating a network movement method of the digital media server in the 2-box model according to an embodiment.

The digital media server 200A is connected to the ISN (operation S1100).

When the digital media server 200A receives, from the digital media player 100A, a request for access to the WFDN (operation S1101), the digital media server 200A checks whether it is necessary to be disconnected from the ISN in order to access the WFDN (operation S1103).

If the disconnection from the ISN is not necessary, the digital media server 200A accesses the WFDN through an available communication module (operation S1119).

On the contrary, if the disconnection from the ISN is necessary, the digital media server 200A checks a state of a communication module connected to the ISN (operation S1109).

When the communication module connected to the ISN is in an active state, i.e., when the digital media server 200A provides the AV service through the ISN, the digital media server 200A requests permission from the relevant control point device 100 (operation S1111). The DMS may request the permission from the DMP to which the DMS provides AV content. The DMS may request the permission from the DMC that controls the DMS.

When the digital media server 200A is unable to receive the permission or receives a movement rejection message (operation S1112), the digital media server 200A suspends movement to the WFDN and maintains a connection to the ISN.

When the communication module connected to the ISN is in an idle state (operation S1109), or when the digital media server 200A receives the permission (operation S1112), the digital media server 200A adds "Wi-Fi Direct" to the friendly name of the digital media server 200A (operation S1113). The digital media server 200A may add the "Wi-Fi Direct" to a front part of the friendly name of the digital media server 200A. For example, in the case where the friendly name of the digital media server 200A is "My server1", the digital media server 200A may change the friendly name thereof into "Wi-Fi Direct My server1".

Thereafter, the digital media server 200A multicasts the network movement advertising message to the control point device 100 in the ISN before disconnecting from the ISN (operation S1113), and multicasts the NAI about the WFDN to the control point devices 100 in the ISN (operation S1115).

After the digital media server 200A multicasts the network movement advertising message and the NAI, the digital media server 200A disconnects from the ISN (operation S1117) and accesses the WFDN (operation S1119).

While accessing the WFDN (operation S1120), if one Wi-Fi direct (WFD) session is finished (operation S1121), the digital media server 200A checks whether all WFD sessions are finished (operation S1123).

If all WFD sessions are not finished (operation S1123), the digital media server 200A multicasts the NAI to the control point device 100 in the ISN (operation S1125), and maintains a connection to the WFDN.

If all WFD sessions are finished (operation S1123), the digital media server 200A deletes "Wi-Fi Direct" from the friendly name of the digital media server 200A (operation S1127).

Thereafter, the digital media server 200A multicasts the network movement advertising message to the control point device 100 in the WFDN before disconnecting from the WFDN (operation S1129), and multicasts the NAI about the ISN to the control point devices 100 of the WFDN before moving to the ISN (operation S1131).

After the digital media server 200A multicasts the network movement advertising message and the NAI, the digital media server 200A disconnects from the WFDN (operation S1133) and accesses the ISN (operation S1135).

Figure 20:
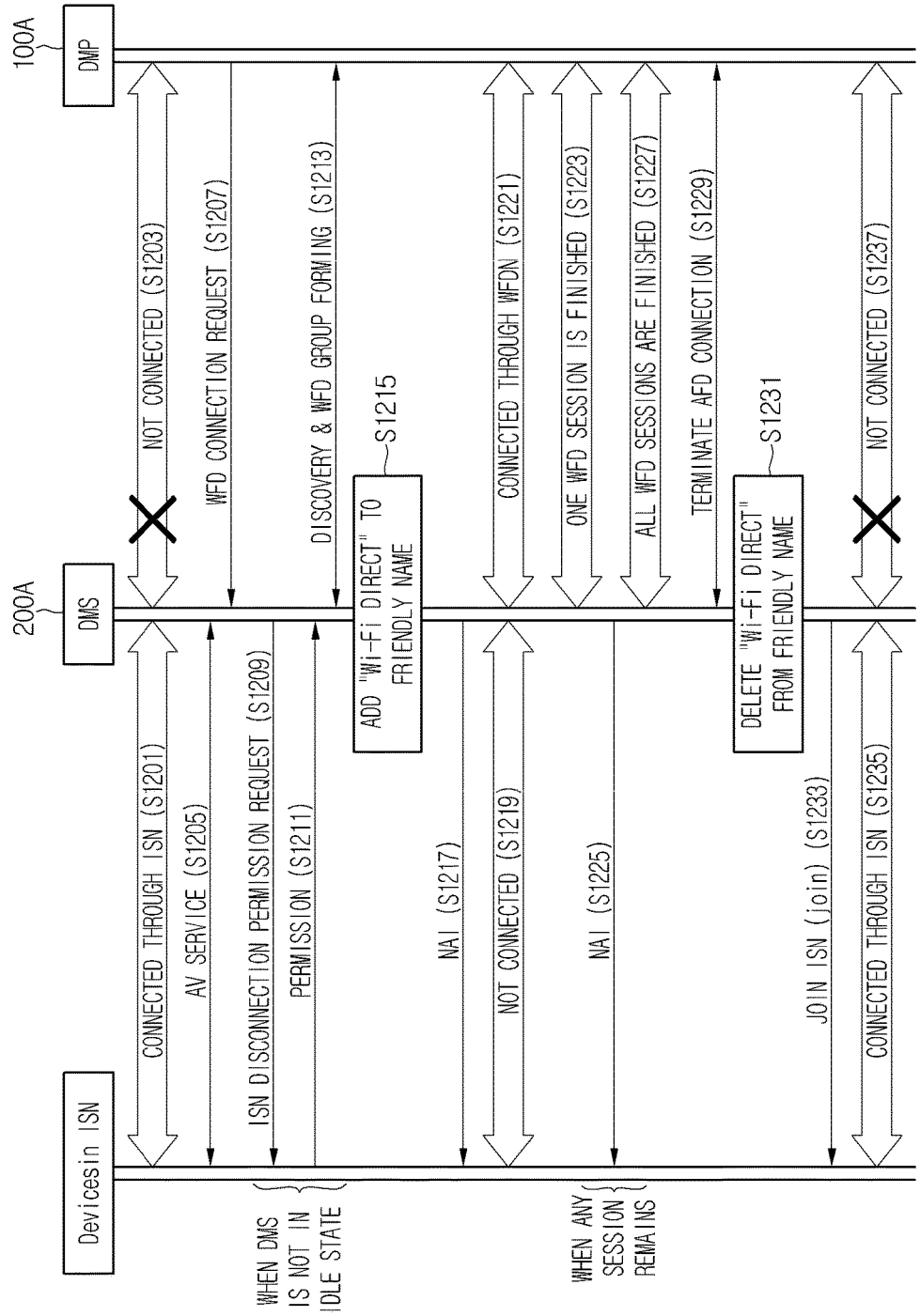
FIG. 20 is a ladder diagram illustrating a network movement method of the digital media server in the 2-box model according to an embodiment.

FIG. 20 is a ladder diagram illustrating a network movement method of the digital media server in the 2-box model according to an embodiment.

The digital media server 200A is connected to the ISN (operation S1201).

The digital media server 200A does not have a connection with the digital media player 100A (operation S1203).

The digital media server 200A may provide AV content to at least one device in the ISN (operation S1205).

When the digital media server 200A receives, from the digital media player 100A, a request for accessing the WFDN (operation S1207), the digital media server 200A requests, through unicast or multicast, permission for disconnection from the ISN from the relevant control point device 100, in the case where the communication module connected to the ISN is not in the idle state (operation S1209).

In the case where the digital media server 200A receives the permission through the unicast (operation S1211), the digital media server 200A and the digital media player 100A perform discovery and form a WFD group (operation S1213).

Further, the digital media server 200A adds "Wi-Fi Direct" to the friendly name of the digital media server 200A (operation S1215).

Thereafter, the digital media server 200A multicasts the NAI about the WFDN to the control point devices 100 of the ISN before moving to the WFDN (operation S1217).

After the digital media server 200A multicasts the network movement advertising message and the NAI, the digital media server 200A disconnects from the ISN (operation S1219) and accesses the WFDN (operation S1221).

While accessing the WFDN, if one WFD session is finished (operation S1223), the digital media server 200A checks whether all WFD sessions are finished (operation S1127).

If all WFD sessions are not finished, the digital media server 200A multicasts the NAI to the control point device 100 in the ISN (operation S1225), and maintains a connection to the WFDN.

If all WFD sessions are finished (operation S1127), the digital media server 200A terminates the WFD connection (operation S1229) and deletes "Wi-Fi Direct" from the friendly name of the digital media server 200A (operations S1131).

Thereafter, the digital media server 200A multicasts the network movement advertising message to the control point device 100 in the WFDN before disconnecting from the WFDN, and multicasts the NAI about the ISN to the control point devices 100 of the WFDN before moving to the ISN.

After the digital media server 200A multicasts the network movement advertising message and the NAI, the digital media server 200A disconnects from the WFDN (operation S1237) and accesses the ISN (operations S1233, S1235).

Figure 21:
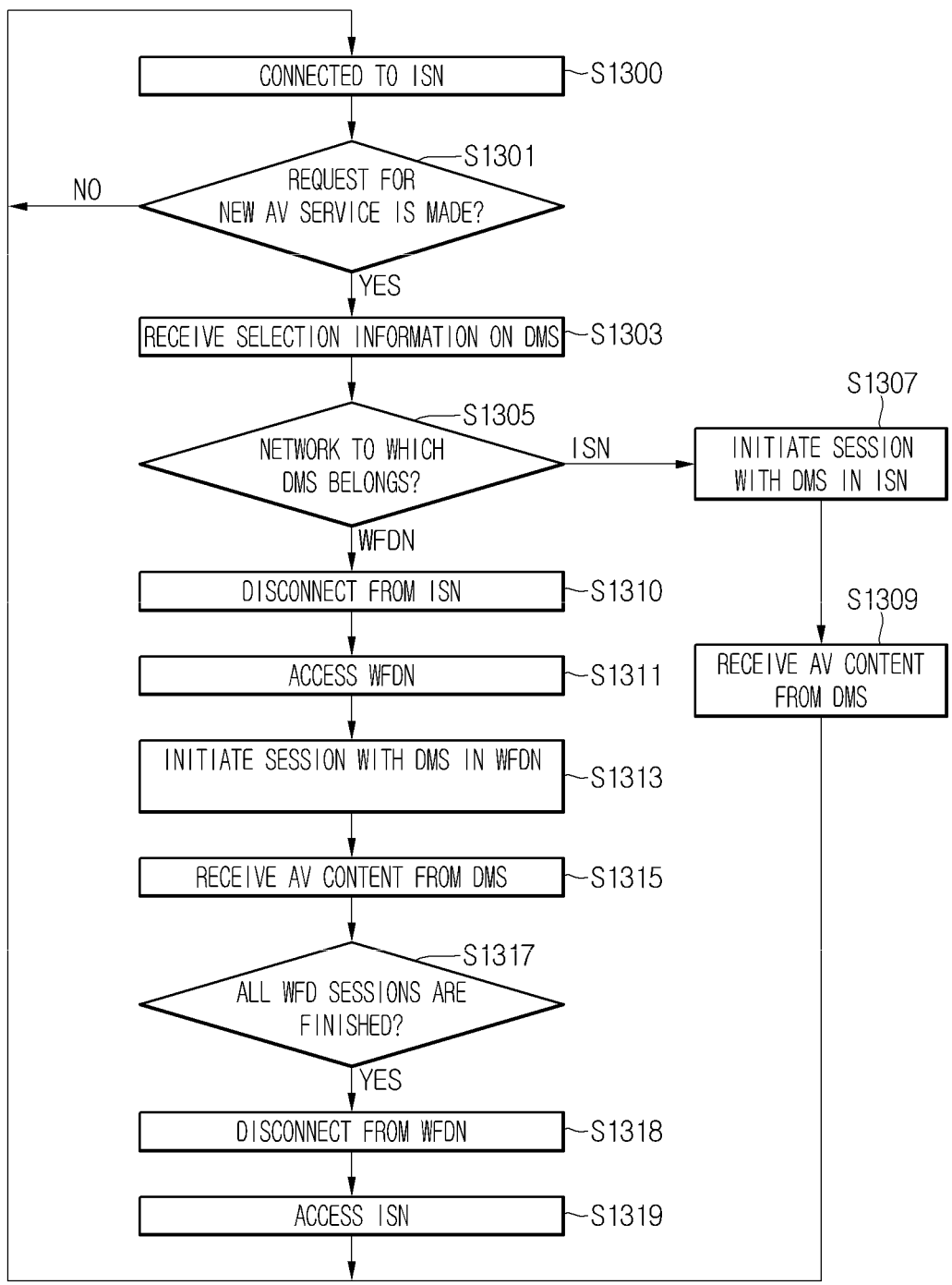
FIG. 21 is a flowchart illustrating a network movement method of a digital media player in the 2-box model according to an embodiment.

FIG. 21 is a flowchart illustrating a network movement method of the digital media player in the 2-box model according to an embodiment.

The digital media player 100A is connected to the ISN (operation S1300).

If a request for a new AV service is made (operation S1301), the digital media player 100A receives selection information on the digital media server 200A (S1303).

The digital media player 100A determines whether the digital media server 200A is in the ISN or in the WFDN (operation S1305).

If the digital media server 200A is in the ISN (operation S1305), the digital media player 100A initiates a session with the digital media server 200A in the ISN (operation S1307), and receives, through this session, the AV content from the digital media server 200A (operation S1309).

If the digital media server 200A is in the WFDN (operation S1305), the digital media player 100A disconnects from the ISN (operation S1310) and accesses the WFDN (operation S1311).

Thereafter, the digital media player 100A initiates a session with the digital media server 200A in the WFDN (operation S1313), and receives, through this session, the AV content from the digital media server 200A (operation S1315).

When all WFD sessions are finished (operation S1317), the digital media player 100A disconnects from the WFDN (operation S1318) and returns to the ISN (operation S1319).

Figure 22:
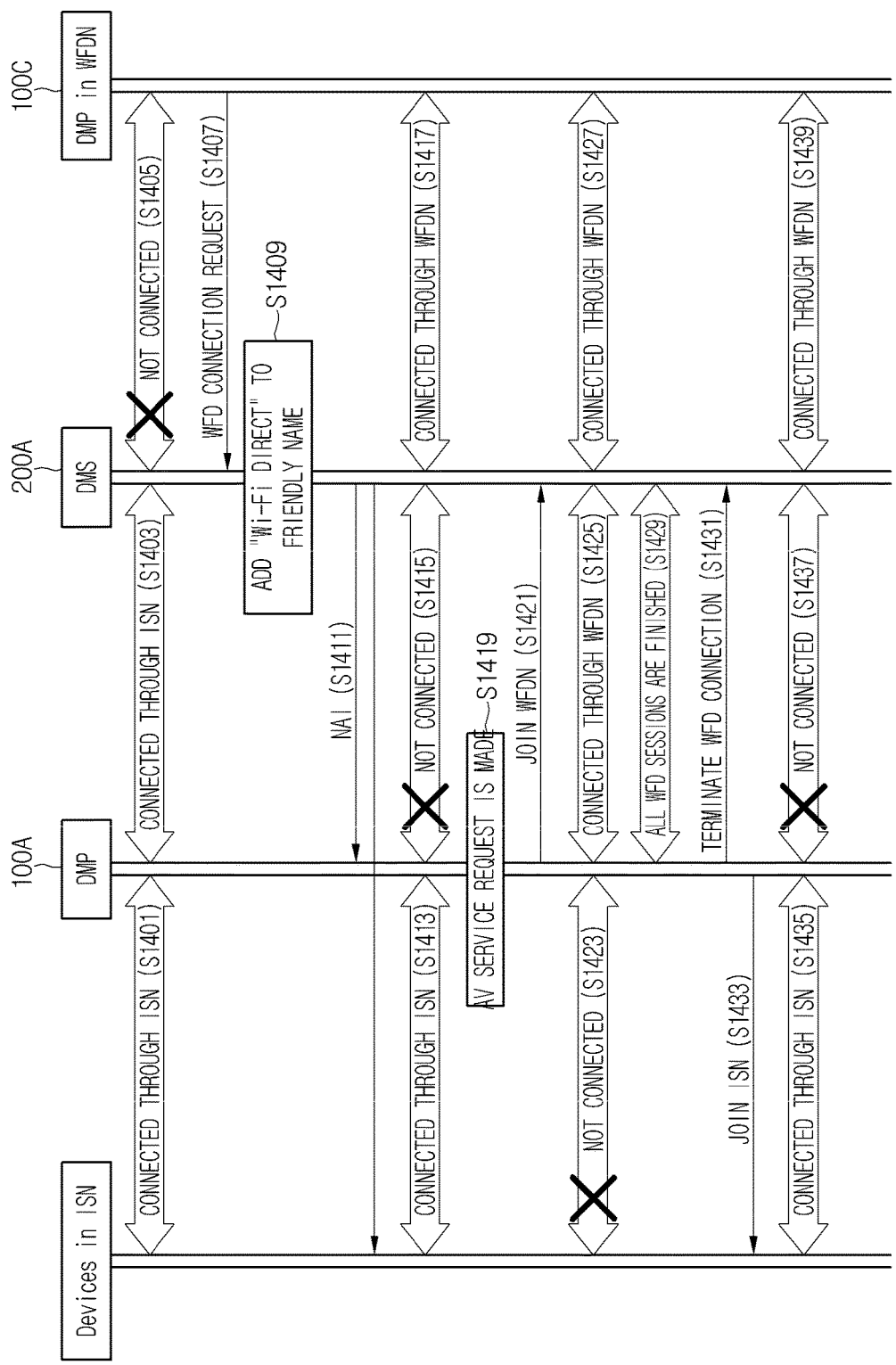
FIG. 22 is a ladder diagram illustrating a network movement method of devices of the 2-box model according to another embodiment.

FIG. 22 is a ladder diagram illustrating a network movement method of devices of the 2-box model according to another embodiment.

The digital media player 100A is connected to devices in the ISN through the ISN (operation S1401).

The digital media player 100A is connected to the digital media server 200A through the ISN (operation S1403).

Another digital media player 100C in the WFDN does not have a connection with the digital media server 200A (operation S1405).

When the digital media server 200A receives, from the other digital media player 100C in the WFDN, a WFD connection request (operation S1407), the digital media server 200A adds "Wi-Fi Direct" to the friendly name of the digital media server 200A (operation S1409), and multicasts the NAI about the WFDN to the control point devices 100 of the ISN before moving to the WFDN (operation S1411).

After the digital media server 200A multicasts the network movement advertising message and the NAI, the digital media server 200A disconnects from the ISN (operation S1415) and accesses the WFDN (operation S1417). The digital media player 100A is still connected to the devices in the ISN through the ISN (operation S1413).

When the digital media player 100A desires the AV service of the digital media server 200A (operation S1419), the digital media player 100A may recognize that the digital media server 200A is connected to the WFDN based on the NAI multicast in operation S1411, and thus the digital media player 100A disconnects from the ISN (operation S1423) and accesses the WFDN (operations S1421, S1425).

Thereafter, the digital media player 100A initiates a session with the digital media server 200A in the WFDN, and receives, through this session, the AV content from the digital media server 200A.

When all WFD sessions of the digital media player 100A are finished (operation S1429), the digital media player 100A disconnects from the WFDN (operations S1431, S1437) and returns to the ISN (operations S1433, S1435).

Figure 23:
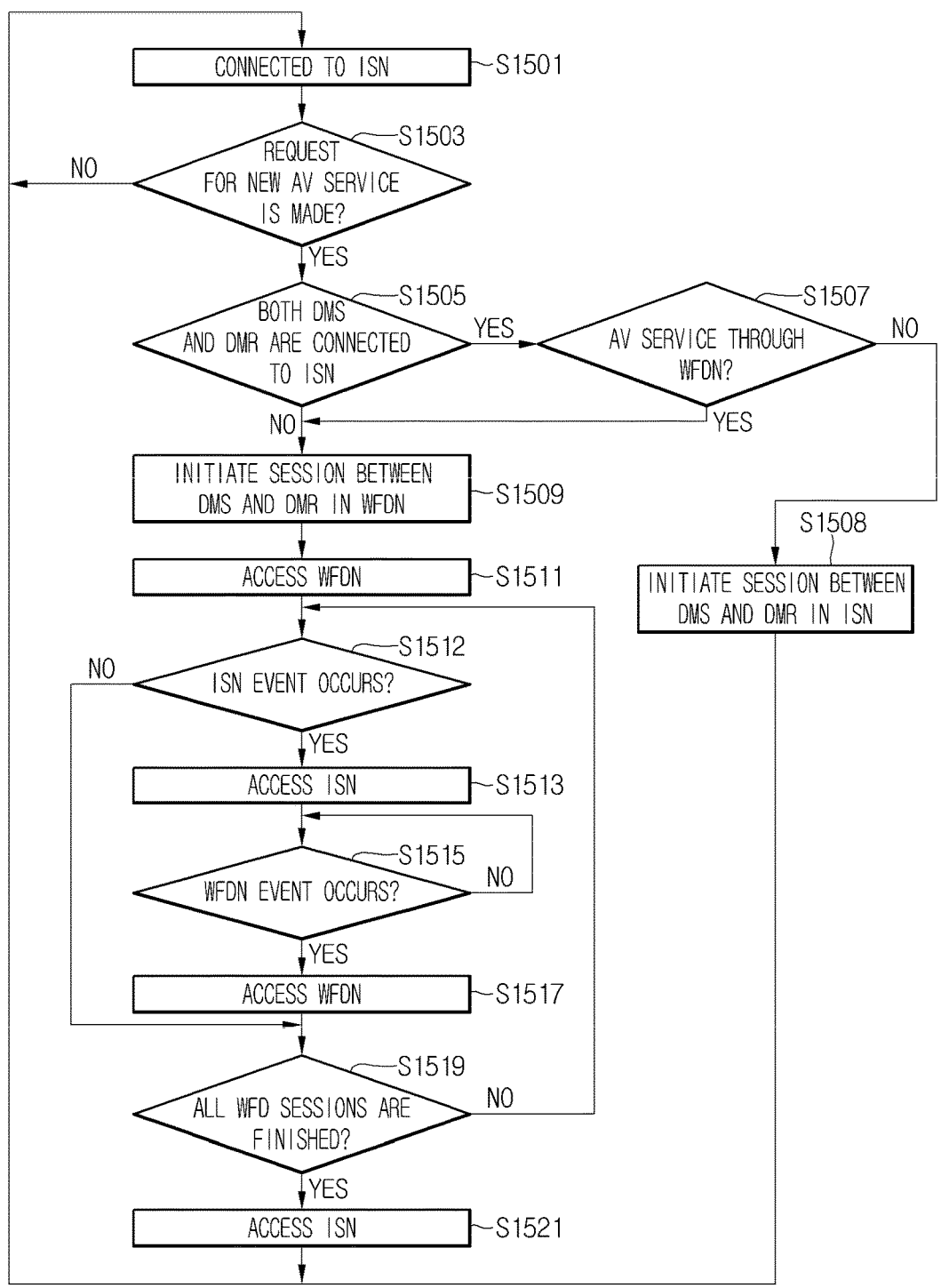
FIG. 23 is a flowchart illustrating an operating method of a digital media player in a 3-box model according to an embodiment.

FIG. 23 is a flowchart illustrating an operating method of a digital media player in the 3-box model according to an embodiment.

The digital media controller 100B is connected to the devices in the ISN through the ISN (operation S1501).

When a request for the AV service between the digital media server 200A and the digital media renderer 200B is made (operation S1503), the digital media controller 100B determines whether both the digital media server 200A and the digital media renderer 200B are in the ISN (operation S1505).

If both the digital media server 200A and the digital media renderer 200B are in the ISN, the digital media controller 100B determines whether to perform the AV service through the WFDN (operation S1507).

In the case where the AV service is performed through the ISN (operation S1507), the digital media controller 100B initiates a session between the digital media server 200A and the digital media renderer 200B in the ISN (operation S1508).

In the case where both the digital media server 200A and the digital media renderer 200B are not in the ISN (operation S1505) or the AV service is performed through the WFDN (operation S1507), the digital media controller 100B initiates a session between the digital media server 200A and the digital media renderer 200B in the WFDN (operation S1509). The digital media controller 100B transmits the network movement request message to one of the digital media server 200A and the digital media renderer 200B which is connected to the ISN, and the device which has received the network movement request message multicasts the NAI and then moves to the WFDN.

The digital media controller 100B accesses the WFDN to which the digital media server 200A and the digital media renderer 200B are connected, based on the NAI multicast by the digital media server 200A or the digital media renderer 200B while the digital media server 200A or the digital media renderer 200B performs the network movement or the NAI collected through the multi-network advertising or the multi-network discovery (operation S1511).

If an emergency event of ISN connection request occurs in the digital media controller 100B while the digital media controller 100B accesses the WFDN (operation S1512), the digital media controller 100B disconnects from the WFDN and visits the ISN (operation S1513). When the emergency event is finished or when it is necessary to control the digital media server 200A and the digital media renderer 200B in the WFDN (operation S1515), the digital media controller 100B returns to the WFDN (S1517).

If all WFD sessions of the digital media controller 100B are finished while the digital media controller 100B accesses the WFDN (operation S1519), the digital media controller 100B returns to the ISN (operation S1521).

Figure 24:
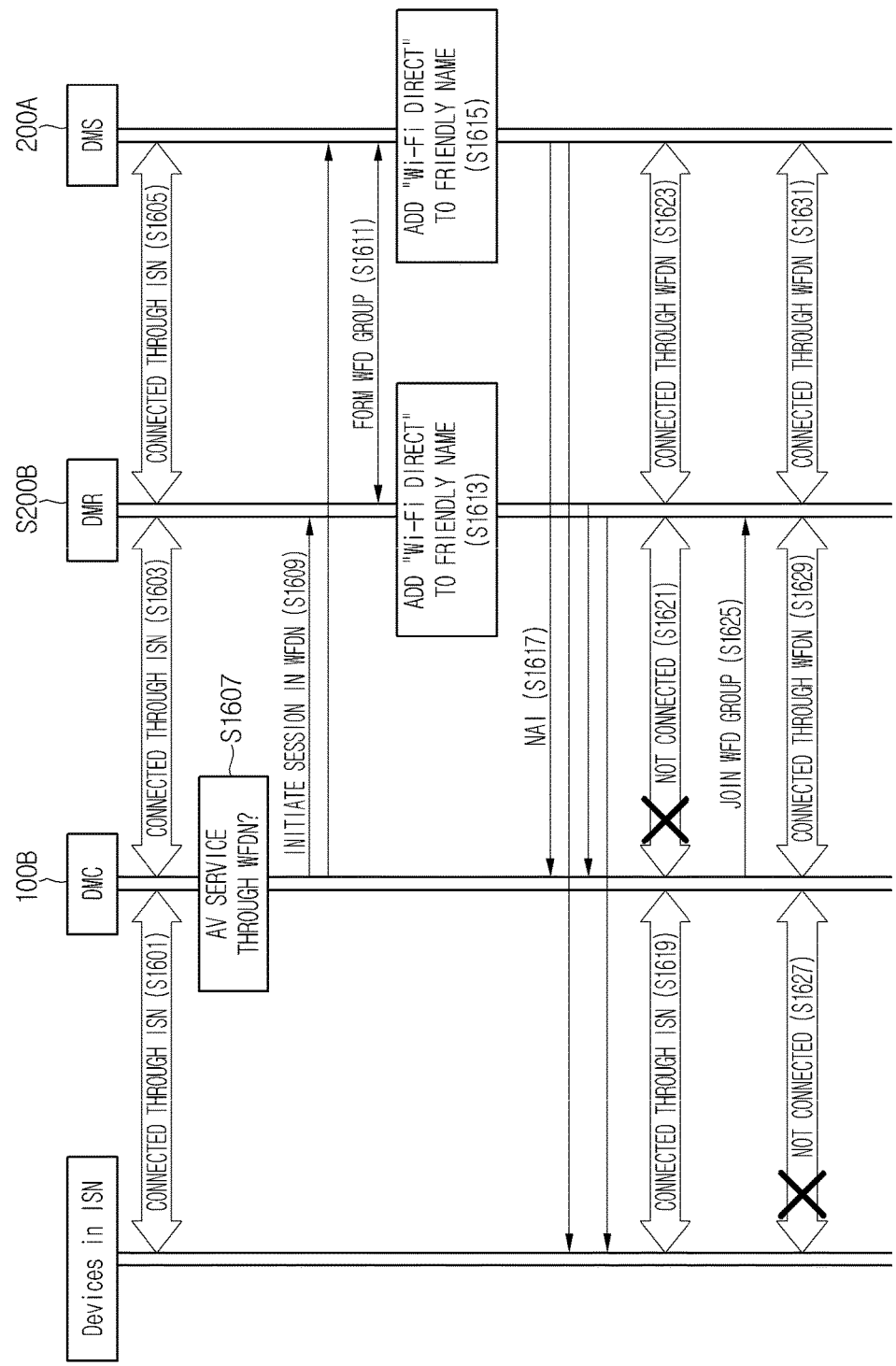
FIGS. 24 and 25 are ladder diagrams illustrating a network movement method of devices of the 3-box model according to an embodiment.
Figure 25:
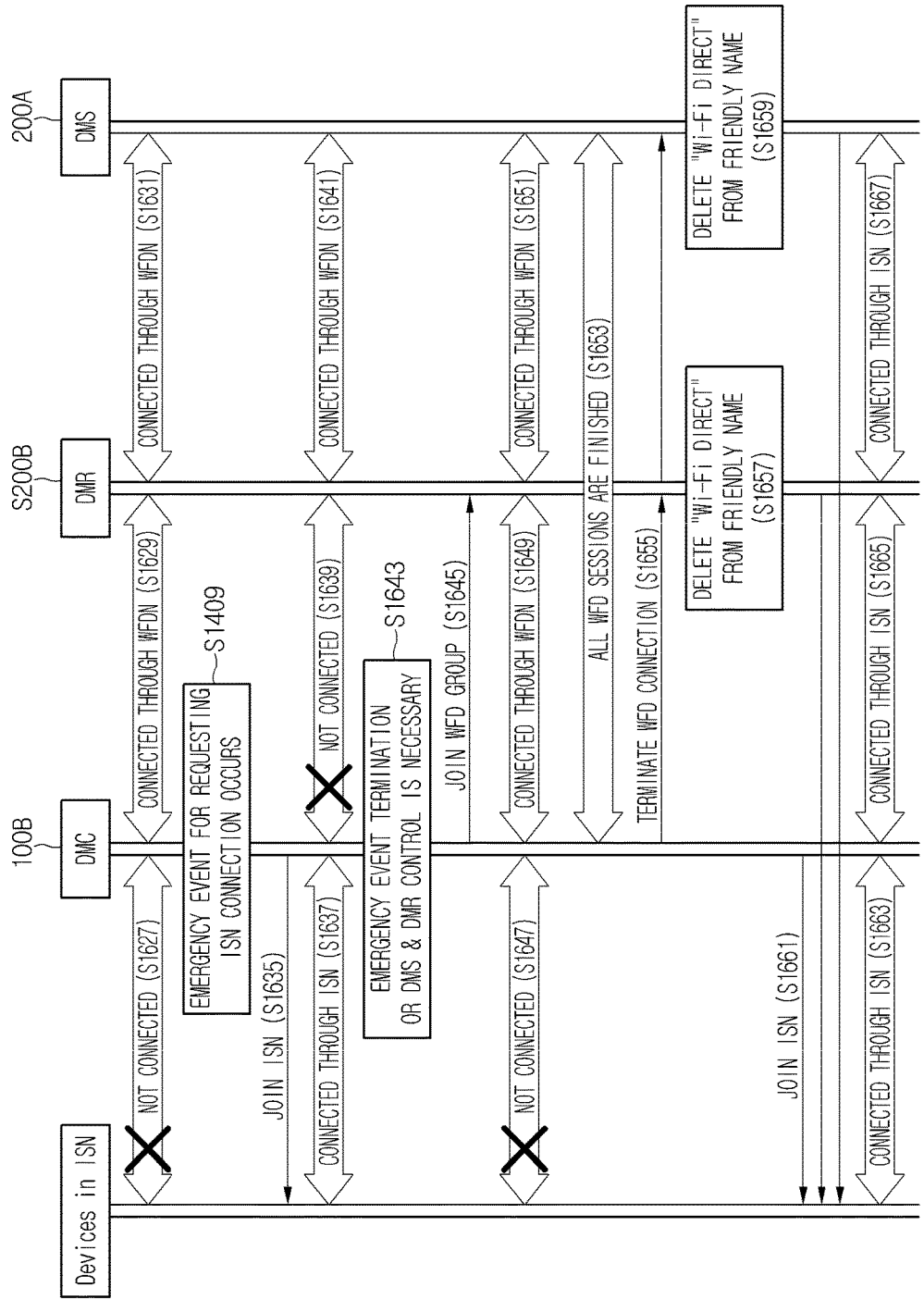

FIGS. 24 and 25 are ladder diagrams illustrating a network movement method of devices of the 3-box model according to an embodiment.

As illustrated in FIG. 24, the digital media controller 100B is connected to the devices in the ISN through the ISN (operation S1601).

The digital media player 100B is connected to the digital media renderer 200B through the ISN (operation S1603).

The digital media server 200A is connected to the digital media renderer 200B through the ISN (operation S1605).

The digital media controller 100B determines whether to perform the AV service through the WFDN (operation S1607).

In the case where the AV service is performed through the WFDN (operation S1607), the digital media controller 100B initiates a session between the digital media server 200A and the digital media renderer 200B in the WFDN (operation S1609).

The digital media server 200A and the digital media renderer 200B which have received a session initiating control message form a WFD group (operation S1611).

The digital media server 200A adds "Wi-Fi DIRECT" to the friendly name of the digital media server 200A (operation S1613).

The digital media renderer 200B adds "Wi-Fi DIRECT" to the friendly name of the digital media renderer 200B (operation S1615).

The digital media server 200A and the digital media renderer 200B multicast the NAI to the control point devices 100 in the ISN before moving to the WFDN (operation S1617).

In this manner, the digital media controller 100B is still connected to the devices in the ISN through the ISN (operation S1619), the digital media controller 100B does not have a connection with the digital media renderer 200B and the digital media server 200A (operation S1621), and the digital media server 200A is connected to the digital media renderer 200B through the WFDN (operation S1623).

The digital media controller 100B moves the digital media server 200A and the digital media renderer 200B to the WFDN, and then joins the WFD group in order to control the digital media server 200A and the digital media renderer 200B (operation S1625).

In this manner, the digital media controller 100B is disconnected from the devices in the ISN (operation S1627), the digital media controller 100B is connected to the digital media renderer 200B and the digital media server 200A through the WFDN (operation S1629), and the digital media server 200A is still connected to the digital media renderer 200B through the WFDN (operation S1631).

If an emergency event of ISN connection request occurs in the digital media controller 100B while the digital media controller 100B accesses the WFDN (operation S1633), the digital media controller 100B disconnects from the WFDN and visits the ISN (operation S1635).

In this manner, the digital media controller 100B is connected to the devices in the ISN through the ISN (operation S1637), the digital media controller 100B does not have a connection with the digital media renderer 200B and the digital media server 200A (operation S1639), and the digital media server 200A is connected to the digital media renderer 200B through the WFDN (operation S1641).

When the emergency event is finished or when it is necessary to control the digital media server 200A and the digital media renderer 200B in the WFDN (operation S1643), the digital media controller 100B returns to the WFDN (S1645).

In this manner, the digital media controller 100B is disconnected from the devices in the ISN (operation S1647), the digital media controller 100B is connected to the digital media renderer 200B and the digital media server 200A through the WFDN (operation S1649), and the digital media server 200A is still connected to the digital media renderer 200B through the WFDN (operation S1651).

If all WFD sessions of the digital media controller 100B are finished while the digital media controller 100B accesses the WFDN (operation S1653), the digital media controller 100B transmits a WFD connection termination command message to the digital media renderer 200B and the digital media server 200A (operation S1655).

The digital media renderer 200B and the digital media server 200A which have received the WFD connection termination command message delete "Wi-Fi DIRECT" from the friendly names of the digital media renderer 200B and the digital media server 200A (operations S1657, S1659).

Thereafter, the digital media controller 100B, the digital media renderer 200B, and the digital media server 200A return to the ISN (operation S1661).

In this manner, the digital media controller 100B is connected to the devices in the ISN through the ISN (operation S1663), the digital media controller 100B is connected to the digital media renderer 200B and the digital media server 200A through the ISN (operation S1665), and the digital media server 200A is connected to the digital media renderer 200B through the ISN (operation S1667).

Structures of the control point device 100 and the control target device 200 according to an embodiment will be described with reference to FIG. 26.

Figure 26:
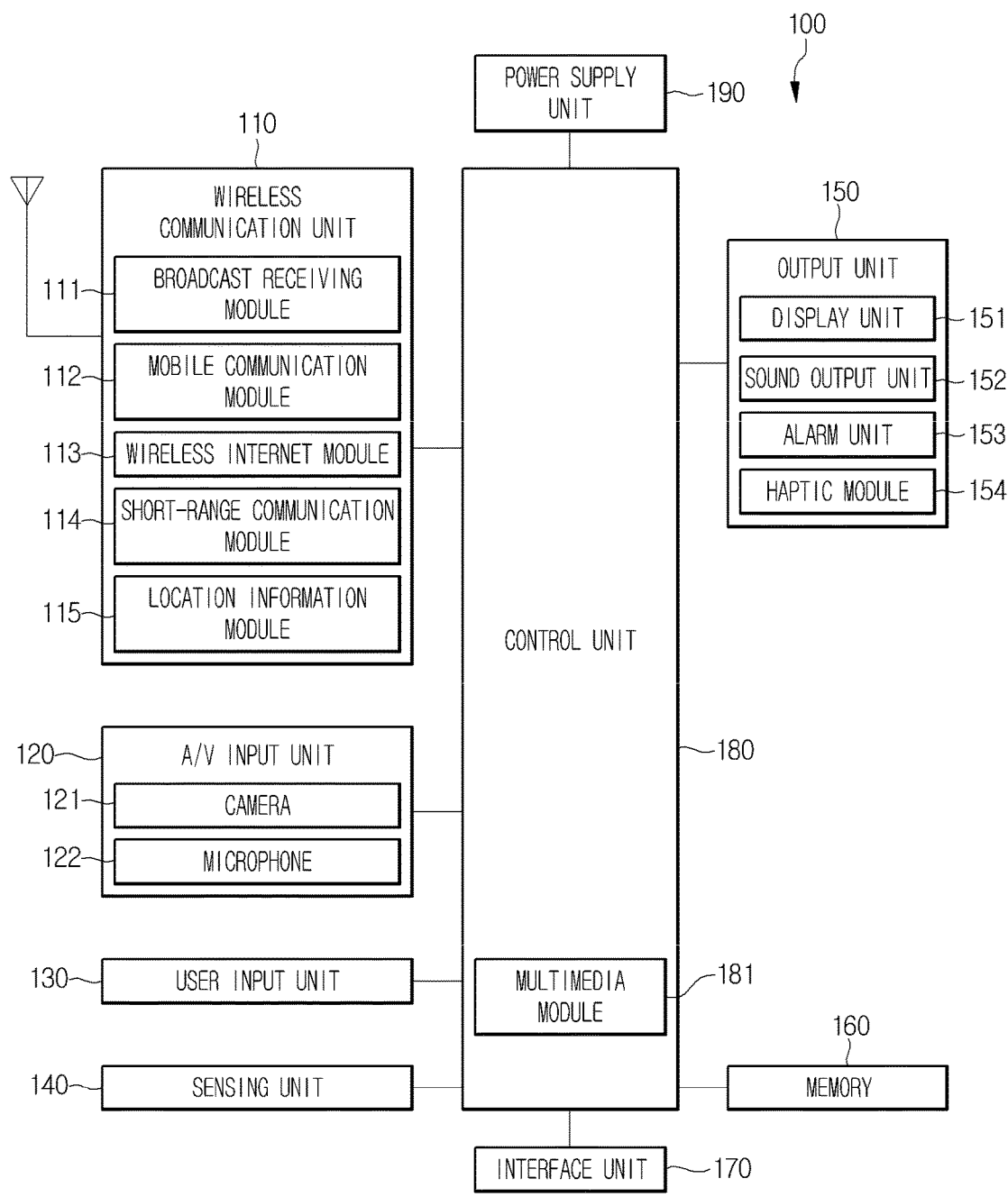
FIG. 26 is a block diagram illustrating devices according to an embodiment.

FIG. 26 is a block diagram illustrating the devices according to an embodiment.

For convenience, description is focused on the control point device 100. However, the block diagram of FIG. 26 may be applied to the control target device 200. In addition, for convenience, the control point device 100 and the control target device 200 may be referred to as terminals.

The control point device 100 or the control target device 200 may include a wireless communication unit 110, an audio/video (A/V) input unit 120, a user input unit 130, a sensing unit 140, an output unit 150, a memory 160, an interface unit 170, a control unit 180, and a power supply unit 190. All the elements illustrated in FIG. 26 are not essential, and thus, the control point device may include more elements or less elements.

Hereinafter, the above-mentioned elements will be described.

The wireless communication unit 110 may include at least one module that enables communication between the control point device 100 and a wireless communication system or between the control point device 100 and a network where the control point device 100 is located. For example, the wireless communication unit 110 may include at least one broadcast receiving unit 111, at least one mobile communication module 112, at least one wireless internet module 113, at least one short-range communication module 114, and at least one location information module 115.

The terminal may access a network through such communication modules.

More specifically, in an embodiment, the wireless communication unit 110 may transmit or receive, through the multicast or unicast, the above-mentioned messages or device information, being controlled by the control unit 180. Collected device information is stored in the memory 160.

The broadcast receiving unit 111 receives, from an external broadcast management server, a broadcast signal and/or broadcast-related information through a broadcast channel.

The broadcast channel may include a satellite channel and a terrestrial channel. The broadcast management server may represent a server that generates and transmits the broadcast signal and/or the broadcast-related information, or a server that receives pre-generated broadcast signal and/or broadcast-related information and transmits the received broadcast signal and/or broadcast-related information to the terminal. The broadcast signal may include not only a TV broadcast signal, a radio broadcast signal, and a data broadcast signal but also a broadcast signal obtained by combining the TV or radio broadcast signal with the data broadcast signal.

The broadcast-related information may represent information related to a broadcast channel, a broadcast program, or a broadcast service provider. The broadcast-related information may be provided through a mobile communication network. In this case, the broadcast-related information may be received by the mobile communication module 112.

The broadcast-related information may have various formats. For example, the broadcast-related information may have a format of an electronic program guide (EPG) of digital multimedia broadcasting (DMB) or an electronic service guide (ESG) of a digital video broadcast-handheld (DVB-H).

The broadcast receiving module 111 may receive a digital broadcast signal using a digital broadcasting system such as digital multimedia broadcasting-terrestrial (DMB-T), digital multimedia broadcasting-satellite (DMB-S), media forward link only (MediaFLO), digital video broadcast-handheld (DVD-H), or integrated services digital broadcast-terrestrial (ISDB-T). The broadcast receiving module 111 may be configured to be suitable for other broadcasting systems.

The broadcast signal and/or the broadcast-related information received through the broadcast receiving module 111 may be stored in the memory 160.

The mobile communication module 112 transmit/receive radio signals to/from at least one of a base station, an external terminal, and a server on the mobile communication network. The radio signal may include various types of data according to transmission of a voice call signal, a video call signal, or character/multimedia messages.

The wireless internal module 113 represents a module for wireless internet access, and may be installed in the control point device 100 or outside the control point device 100. A wireless internet technology such as wireless LAN (WLAN) (Wi-Fi), wireless broadband (Wibro), world interoperability for microwave access (Wimax), or high speed downlink packet access (HSDPA) may be used.

More specifically, in an embodiment, the control unit 180 accesses the ISN or the WFDN through the wireless internet module 113. When the number of accessible networks is smaller than that of the wireless internet modules 113, the control unit 180 disconnects from a network connected through one wireless internet module 113 to access another network.

The short-range communication module 114 represents a module for short-range communication. A short-range communication technology such as Bluetooth, radio frequency identification (RFID), infrared data association (IrDA), ultra wideband (UWB), or ZigBee may be used.

The location information module 115 serves to acquire a location of the terminal, and, for example, a global positioning system (GPS) module may be used.

Referring to FIG. 26, the A/V input unit 120 is for inputting an audio signal or a video signal, and may include a camera 121 and a microphone 122. The camera 121 processes image frames of still images or video obtained by an image sensor in a video call mode or an image-capturing mode. The processed image frames may be displayed on a display unit 151.

The image frames processed in the camera 121 may be stored in the memory 160 or may be transmitted to the outside through the wireless communication unit 110. Two or more cameras 121 may be provided according to a use environment.

The microphone 122 receives and processes an external sound signal to obtain electrical voice data, in a call mode, a recording mode, or a voice recognition mode. In the case of the call mode, the voice data may be converted into a format that enables transmission to a mobile communication base station. Various noise elimination algorithms may be applied to the microphone 122 to eliminate noise generated while the external sound signal is received.

In the user input unit 130, the user generates input data for controlling an operation of the terminal. The user input unit 130 may include a keypad, a dome switch, a touchpad (resistive/capacitive type), a jog wheel, and a jog switch.

The sensing unit 140 detects a current state of the control point device 100, and more specifically, detects, for example, whether the control point 100 is opened/closed and whether the user contacts the control point 100, and detects an azimuth and acceleration/deceleration of the terminal. Then, the sensing unit 140 generates a sensing signal for controlling an operation of the control point device 100. For example, in the case where the control point device 100 is a slide-type phone, it may be sensed whether the phone is opened/closed. Further, it may be sensed whether power is supplied by the power supply unit 190 and whether the interface unit 170 is connected to external device. The sensing unit 140 may include a proximity sensor (141).

The output unit 150 serves to generate visual, auditory, and tactile outputs. The output unit 150 may include the display unit 151, a sound output module 152, an alarm unit 153, and a haptic module 154.

The display unit 151 displays (outputs) information processed in the control point device 100. For example, in the case where the terminal is in the call mode, the display unit 151 displays a user interface (UI) or graphic user interface (GUI) related to a call. In the case where the control point device 100 is in the video call mode or the image-capturing mode, the display unit 151 displays the UI, GUI, or images captured and/or received.

The display unit 151 may include at least one of a liquid crystal display (LCD), a thin film transistor-liquid crystal display (TFT LCD), an organic light-emitting diode (OLED), a flexible display, and a 3D display.

Some of the displays may be transparent-type or optical transmission-type displays for viewing the outside through the displays. Such a display may be referred to as a transparent display. The transparent display includes, for example, a transparent OLED (TOLED). A rear structure of the display unit 151 may also include an optical transmission structure. Due to such structures, the user may view an object located at the back of a body of the terminal through an area of the display unit 151 of the terminal.

According to a type of the control point device 100, two or more display units 151 may be provided. For example, in the control point device 100, a plurality of display units may be arranged integrally or separately on a single surface or may be arranged on different surfaces respectively.

In the case where the display unit 151 and a sensor for sensing a touch motion (hereinafter, referred to as a touch sensor) form a layer structure (hereinafter, referred to as a touch screen), the display unit 151 may be used as both an output device and an input device. The touch sensor may include, for example, a touch film, a touch sheet, and a touch pad.

The touch sensor may be configured so that a change in pressure on a specific site of the display unit 151 or a change in capacitance of a specific site of the display unit 151 is converted to an electrical input signal. The touch sensor may be configured so as to detect not only a location and an area of a touch but also pressure of the touch.

When a touch input is performed on the touch sensor, signal(s) corresponding to the touch input is (are) transmitted to a touch controller. The touch controller processes the signal(s) and then transmits the processed signal(s) to the control unit 180. Accordingly, the control unit 180 may detect an area of the display unit 151 which has been touched.

Referring to FIG. 26, the proximity sensor 141 may be arranged in an internal area of the terminal surrounded by the touch screen or in the vicinity of the touch screen. The proximity sensor represents a sensor that detects an object approaching a certain detection surface or an object located near the sensor using force of an electromagnetic field or infrared rays without mechanically contacting the object. The proximity sensor 141 has a longer life than that of a contact-type sensor and may be widely applied.

The proximity sensor 141 may include, for example, a transmission-type photoelectric sensor, a direct reflection-type photoelectric sensor, a mirror reflection-type photoelectric sensor, a high-frequency oscillation-type proximity sensor, a capacitive-type proximity sensor, a magnetic proximity sensor, and an infrared proximity sensor. In the case where the touch screen is a capacitive type, an approach of the pointer is detected due to a change in an electric field. In this case, the touch screen (touch sensor) may be classified as a proximity sensor.

Hereinafter, for convenience, "proximity touch" represents an act of proximately locating the pointer on the touch screen without making a contact therewith so that the pointer is recognized, and "contact touch" represents an act of making the pointer directly contact the touch screen. The location for the proximity touch represents such a location where the pointer vertically corresponds to the touch screen when the pointer makes the proximity sensor.

The proximity sensor detects the proximity touch and a proximity touch pattern (e.g. a proximity touch distance, a proximity touch direction, a proximity touch speed, a proximity touch time, a proximity touch location, a proximity touch movement state, etc). Information corresponding to the detected proximity touch motion and the proximity touch pattern may be outputted through the touch screen.

The sound output module 152 may output audio data received from the wireless communication unit 110 or stored in the memory 160 in a call signal receiving mode, a call mode, a recording mode, a voice recognition mode, or a broadcast receiving mode. The sound output module 152 may output a sound signal related to a function performed in the control point device 100 (e.g. call signal receiving sound, message receiving sound, etc). The sound output unit 152 may include a receiver, a speaker, a buzzer, and the like.

The alarm unit 153 outputs a signal for notifying an event occurrence of the control point device 100. The event that occurs in the terminal may include, for example, call signal reception, message reception, key signal input, and touch input. The alarm unit 153 may output a signal for notifying the event occurrence by means of, for example, vibration in addition to a video or audio signal. The video signal or audio signal may be outputted through the display unit 151 or the sound output module 152. Therefore, the display unit 151 or the sound output module 152 may be classified as a part of the alarm unit 153.

The haptic module 154 generates various tactile effects that may be felt by the user. The tactile effect generated by the haptic module 154 includes, for example, vibration. An intensity and a pattern of the vibration generated by the haptic module 154 may be controlled. For example, different vibrations may be synthesized to the outputted or may be sequentially outputted.

In addition to the vibration effect, the haptic module 154 may generate various tactile effects caused by a pin arrangement vertically moving on a contact skin surface, jet or suction of air through a jet or suction hole, sweeping on a skin surface, contact of an electrode, and stimulation by electrostatic force, or effects of giving feeling of warmth/coldness using a heat-absorbing or heating device.

The haptic module 154 may be configured so as to give the tactile effects to the user not only through a direct contact but also through muscle sense of a finger or an arm. Two or more haptic modules 154 may be provided according to configuration of the terminal.

The memory 160 may store a program for operating the control unit 180 and may temporarily store input/output data (e.g. phonebook, message, still image, video, etc). The memory 160 may store data on various patterns of vibration and sound outputted when the touch input performed on the touch screen.

The memory 160 may include at least one of storage media such as a flash memory, a hard disk, a multimedia card micro, a card-type memory (e.g. SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The control point device 100 may be operated in association with a web storage for performing a storage function of the memory 160 on the internet.

The interface unit 170 serves as a passage to all external devices connected to the control point device 100.

The interface unit 170 receives data from the external devices, delivers power to each element in the control point device 100, or allows data in the control point device 100 to be transmitted to the external devices. For example, the interface unit 170 may include a wired/wireless headset port, an external charger port, a wired/wireless data port, a memory card port, a port for connecting a device having an identification module, an audio input/output (I/O) port, a video I/O port, and an earphone port.

The identification module stores various information for authenticating authority for use of the control point device 100. The identification module may include a user identify module (UIM), a subscriber identity module (SIM), and a universal subscriber identity module (USIM). The device having the identification module (hereinafter, referred to as an identification device) may be manufactured in a form of a smart card. Thus, the identification device may be connected to the terminal through a port.

The interface unit may be a passage for supplying power from an external cradle to the terminal when the terminal is connected to the cradle. The interface unit may be a passage for transmitting various command signals, inputted to the cradle by the user, to the terminal. The various command signals or the power inputted from the cradle may serve as signals for recognizing whether the terminal is correctly mounted on the cradle.

The control unit 180 controls an overall operation of the terminal. For example, the control unit 180 performs control and process related to a voice call, data communication, and a video call. The control unit 180 may be provided with a multimedia module 181 for playing multimedia. The multimedia module 181 may be installed in the control unit 180 or may be separated from the control unit 180.

The control unit 180 performs the determinations and decisions described above with reference to FIGS. 1 to 25. That is, the control unit 180 may performs the operations illustrated in FIGS. 1 to 25, controlling the wireless communication unit 110.

The control unit 180 may perform a pattern recognition process for recognizing characters and images from writing input and picture drawing performed on the touch screen.

The power supply unit 190 receives external power and internal power and supplies power required for operating each element, according to control by the control unit 180.

The various embodiments described herein may be implemented, for example, in a recording medium readable by a computer or a similar device using software, hardware, or a combination thereof.

For implementation with hardware, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electric units. In some cases, the embodiments may be implemented with the control unit 180.

For implementation with software, an embodiment related to a procedure or a function may be implemented with a separate software module for performing at least one function or operation. A software code may be implemented by a software application coded by an appropriate programming language. The software coded may be stored in the memory 160 and may be executed by the control unit 180.

According to an embodiment, the above-mentioned methods may be implemented with processor-readable codes in a program-recorded medium. The processor-readable recording medium includes, for example, a ROM, a RAM, a CD-ROM, a magnetic tape, a floppy disk, and an optical data storage device, and may also be implemented as a form of a carrier wave (for example, transmission via the Internet).

The above-mentioned devices are not limited to the configuration and methods of the above-mentioned embodiments. The entirety or part of each embodiment may be selectively combined with each other to make various medications.

The invention claimed is:

1. An operating method of a control point device including a control unit, a display unit and a communication module, the operating method comprising:
    storing, through the control unit, network information on a first network;
    wherein the first network is a network to which the control point device is currently connecting,
    disconnecting from the first network;
    connecting to each of a plurality of connectable networks and collecting device information on at least one of a plurality of UPnP (Universal Plus and Play) or DLNA (Digital Living Network Alliance) control target devices connected to the each of the plurality of connectable networks;
    wherein the device information comprises network access information on networks to which the plurality of UPnP or DLNA control target devices belong, device discovery information on the plurality of UPnP or DLNA control target devices, and a stored content list of the plurality of UPnP or DLNA control target devices;
    returning to the first network based on the stored network information;
    displaying, through the display unit, the device discovery information, the network access information and the stored content list;
    receiving selection information on a selected content in the stored content list;
    checking a UPnP or DLNA control target device storing the selected content to determine whether the first network is the same as a second network,
    wherein the second network is a network to which the UPnP or DLNA control target device is currently connecting;
    displaying, through the display unit, a request message for requesting network movement permission when the first network is different from the second network;
    moving, through the communication module, from the first network to the second network when receiving a permission response to the request message; and
    receiving the selected content from the control target device and providing the selected content;
    wherein the first network corresponds to an infrastructure network (ISN) and the second network corresponds to a Wi-Fi direct network (WFDN), or
    wherein the first network corresponds to the WFDN and the second network corresponds to the ISN.

2. The operating method according to claim 1, wherein the collecting the device information comprises:
receiving the device information from another control point device.

3. The operating method according to claim 1, further comprising:
receiving the selection information on another selected UPnP or DLNA control target device among the plurality of control target devices;
checking whether a third network to which the another selected UPnP or DLNA control target device is currently connecting to is the same as the second network; and
transmitting, to the another selected UPnP or DLNA control target device, a network movement request message for requesting movement to the second network when the third network is different from the second network.

4. The operating method according to claim 1, further comprising:
returning to the first network when all sessions of the second network are terminated after moving to the second network.

5. A control point device comprising:
a communication device;
a display device; and
a control device,
wherein the control device:
stores network information on a first network;
wherein the first network is a network to which the control point device is currently connecting,
disconnects from the first network;
connects to each of a plurality of connectable networks and collects device information on at least one of a plurality of UPnP (Universal Plug and Play) or DLNA (Digital Living Network Alliance) control target devices connected to the each of the plurality of connectable networks;
wherein the device information comprises network access information on networks to which the plurality of UPnP or DLNA control target devices belong, device discovery information on the plurality of UPnP or DLNA control target devices, and a stored content list of the plurality of UPnP or DLNA control target devices;
returns to the first network based on the stored network information;
displays, through the display device, the device discovery information, the network access information and the stored content list;
receives selection information on a selected content in the stored content list;
checks a UPnP or DLNA control target device storing the selected content to determine whether the first network is the same as a second network, wherein the second network is a network to which the UPnP or DLNA control target device is currently connecting;
displays, through the display device, a request message for requesting network movement permission when the first network is different from the second network;
moves, through the communication module, from the first network to the second network when receiving a permission response to the request message; and
receives the selected content from the control target device and provides the selected content;
wherein the first network corresponds to an infrastructure network (ISN) and the second network corresponds to a Wi-Fi direct network (WFDN), or
wherein the first network corresponds to the WFDN and the second network corresponds to the ISN.

6. The control point device according to claim 5, wherein the control device:
disconnects from the second network;
connects to each of a plurality of connectable networks, and multicasts the device discovery information on the plurality of UPnP or DLNA control target devices to each of a plurality of control point devices of a connecting network; and
returns to the second network.

7. The control point device according to claim 5, wherein the control device:
receives an operation termination request message;
disconnects from the second network;
connects to at least one of connectable networks respectively; and
multicasts a network connection termination message to at least one of a plurality of control point devices of a connecting network.

8. The control point device according to claim 5, wherein the control device:
changes a first name of the UPnP or DLNA control target device to a second name when moving from the first network to the second network.

9. The control point device according to claim 8, wherein the control device:
returns to the first network when all sessions of the second network are finished; and
restores the second name to the first name when moving from the second network to the first network.

* * * * *